(12) United States Patent
Lee et al.

(10) Patent No.: US 11,178,334 B2
(45) Date of Patent: Nov. 16, 2021

(54) ELECTRONIC DEVICE TO CONTROL SCREEN PROPERTY BASED ON DISTANCE BETWEEN PEN INPUT DEVICE AND ELECTRONIC DEVICE AND METHOD OF CONTROLLING SAME

(71) Applicant: Samsung Electronics Co., Ltd., Gyeonggi-do (KR)

(72) Inventors: Hwajun Lee, Gyeonggi-do (KR);
Saebyuk Sheen, Gyeonggi-do (KR);
Jaehan Lee, Gyeonggi-do (KR);
Taehee Hwang, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/552,759

(22) Filed: Aug. 27, 2019

(65) Prior Publication Data
US 2020/0068136 A1 Feb. 27, 2020

(30) Foreign Application Priority Data

Aug. 27, 2018 (KR) .......................... 10-2018-0100649

(51) Int. Cl.
*H04N 5/232* (2006.01)
*G06F 3/0484* (2013.01)
(Continued)

(52) U.S. Cl.
CPC ... *H04N 5/232933* (2018.08); *G06F 3/03545* (2013.01); *G06F 3/04845* (2013.01); *H04N 5/23296* (2013.01)

(58) Field of Classification Search
CPC ......... H04N 5/232933; H04N 5/23296; H04N 5/23216; H04N 5/23245; G06F 3/04845;
(Continued)

(56) References Cited

U.S. PATENT DOCUMENTS 8,351,895 B2 1/2013 Penix et al.
9,716,825 B1 7/2017 Manzari et al.
(Continued)

FOREIGN PATENT DOCUMENTS

JP 2015-122013 7/2015
KR 1020120032336 4/2012
(Continued)

OTHER PUBLICATIONS

European Search Report dated Dec. 4, 2019 issued in counterpart application No. 19193750.7-1231, 9 pages.
(Continued)

*Primary Examiner* — Hung H Lam
(74) *Attorney, Agent, or Firm* — The Farrell Law Firm, P.C.

(57) ABSTRACT

An electronic device and method are provided to control screen properties based on a distance between the electronic device and a pen input device. The electronic device includes a camera, a touchscreen display, and a processor configured to display, on the touchscreen display, a screen including at least one target object image corresponding to at least one object obtained by the camera, and change a property of the screen based on a resizing of the at least one target object image according to a movement of at least one of the electronic device or the object.

18 Claims, 26 Drawing Sheets

(51) Int. Cl.
*G06F 3/0354* (2013.01)
*G06F 3/048* (2013.01)

(58) Field of Classification Search
CPC ....... G06F 3/03545; G06F 2203/04806; G06F 3/0383; G06F 3/046; G06F 2203/04807; G06F 2203/0384; G06F 3/0488
See application file for complete search history.

(56) References Cited

U.S. PATENT DOCUMENTS

| | | |
|---|---|---|
| 10,044,939 B2 | 8/2018 | Flores et al. |
| 2007/0057926 A1 | 3/2007 | Ohzawa et al. |
| 2014/0068507 A1* | 3/2014 | Nam .................... G06F 3/0488 715/802 |
| 2014/0157203 A1* | 6/2014 | Jeon .................... G06F 3/04886 715/840 |
| 2015/0091817 A1* | 4/2015 | Chien .................... G06F 9/451 345/173 |
| 2015/0355819 A1* | 12/2015 | Saino .................... G06F 3/0482 715/766 |
| 2016/0119552 A1* | 4/2016 | Oh .................... H04N 5/232935 348/333.06 |
| 2016/0255268 A1* | 9/2016 | Kang .................... H04N 5/23293 348/333.11 |
| 2017/0322642 A1 | 11/2017 | Zhang et al. |
| 2019/0045135 A1* | 2/2019 | Ryu .................... H04N 5/23296 |

FOREIGN PATENT DOCUMENTS

| | | |
|---|---|---|
| KR | 10-1393147 | 5/2014 |
| KR | 10-1589707 | 1/2016 |
| KR | 1020180020734 | 2/2018 |
| WO | WO 2016/064106 | 4/2016 |

OTHER PUBLICATIONS

International Search Report dated Dec. 4, 2019 issued in counterpart application No. PCT/KR2019/010903, 8 pages.

* cited by examiner

ELECTRONIC DEVICE TO CONTROL SCREEN PROPERTY BASED ON DISTANCE BETWEEN PEN INPUT DEVICE AND ELECTRONIC DEVICE AND METHOD OF CONTROLLING SAME

CROSS-REFERENCE TO RELATED APPLICATION(S)

This application is based on and claims priority under 35 U.S.C. § 119 to Korean Patent Application No. 10-2018-0100649, filed on Aug. 27, 2018, in the Korean Intellectual Property Office, the disclosure of which is incorporated by reference herein in its entirety.

BACKGROUND

1. Field

The disclosure relates generally to an electronic device and method to control screen properties based on a distance between a pen input device and the electronic device.

2. Description of Related Art

More services and additional functions are being provided through electronic devices, e.g., smartphones or other portable electronic devices. To meet the needs of various users and to raise the efficiency of using electronic devices, communication service carriers and device manufacturers are competing to develop electronic devices with diversified functionalities. Accordingly, the functions provided through electronic devices are evolving at a fast pace.

SUMMARY

Due to their limited size, portable electronic devices (e.g., smartphones) may display screens with size-limited graphical objects (e.g., a capture button of a camera application). Such size limitations, which compromise portability, may cause smartphone users discomfort in using their device when the smartphone is positioned relatively far away from the user (or if the user is holding a pen input device).

The disclosure has been made to address the above-mentioned problems and disadvantages, and to provide at least the advantages described below.

In accordance with an aspect of the disclosure, an electronic device includes a camera, a touchscreen display, and a processor configured to display, on the touchscreen display, a screen including at least one target object image corresponding to at least one object obtained by the camera, and change a property of the screen based on a resizing of the at least one target object image according to a movement of at, least one of the electronic device or the object.

In accordance with another aspect of the disclosure, a method for controlling an electronic device includes displaying, on a touchscreen display of the electronic device, a screen including at least one target object image corresponding to at least one object obtained by a camera of the electronic device, and changing a property of the screen based on a resizing of the at least one target object image according to a movement of at least one of the electronic device or the object.

In accordance with another aspect of the disclosure, an electronic device comprises a camera, a touchscreen display, and a processor configured to display, on the touchscreen display, a screen including at least one target object image corresponding to at least one object obtained by the camera, and change a property of the screen based on at least one of a strength of a signal received from a wireless external electronic device connected with the electronic device, or based on a resizing of the at least one target object image according to a movement of at least one of the electronic device or the object.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
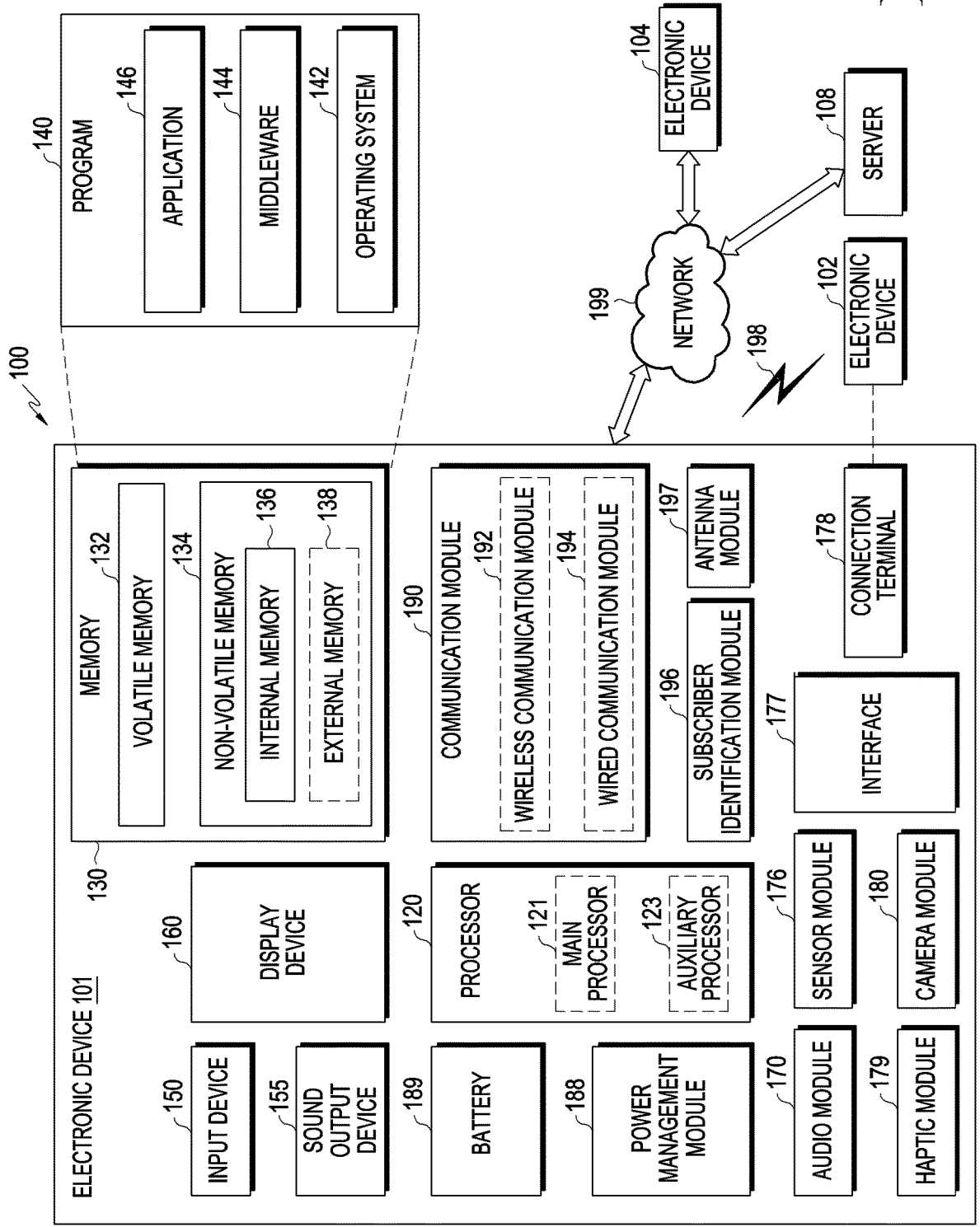
FIG. 1 is a view illustrating an electronic device in a network environment, according to an embodiment.

Various embodiments of the present disclosure are described with reference to the accompanying drawings.

However, various embodiments of the present disclosure are not limited to particular embodiments, and it should be understood that modifications, equivalents, and/or alternatives of the embodiments described herein can be variously made. With regard to description of drawings, similar components may be marked by similar reference numerals.

FIG. 1 is a block diagram illustrating an electronic device 101 in a network environment 100 according to an embodiment.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in nonvolatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a pen input device (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming call. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas. In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, instructions or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

According to an embodiment, an electronic device provides the user with visual convenience by controlling the properties (e.g., the size of graphical objects displayed on the execution screen) of the execution screen (e.g., a preview screen including various graphical objects related to image capturing and a preview image) of an application (e.g., a camera application) based on the distance between the electronic device and a pen input device (e.g., a user holding the pen input device).

According to an embodiment, a method of controlling an electronic device provides the user with visual convenience by controlling the properties of the execution screen of an application based on the distance between the electronic device and a pen input device.

"Execution screen," "preview screen," or "screen" may include various graphical objects (e.g., icons) and at least one or more images.

Figure 2:
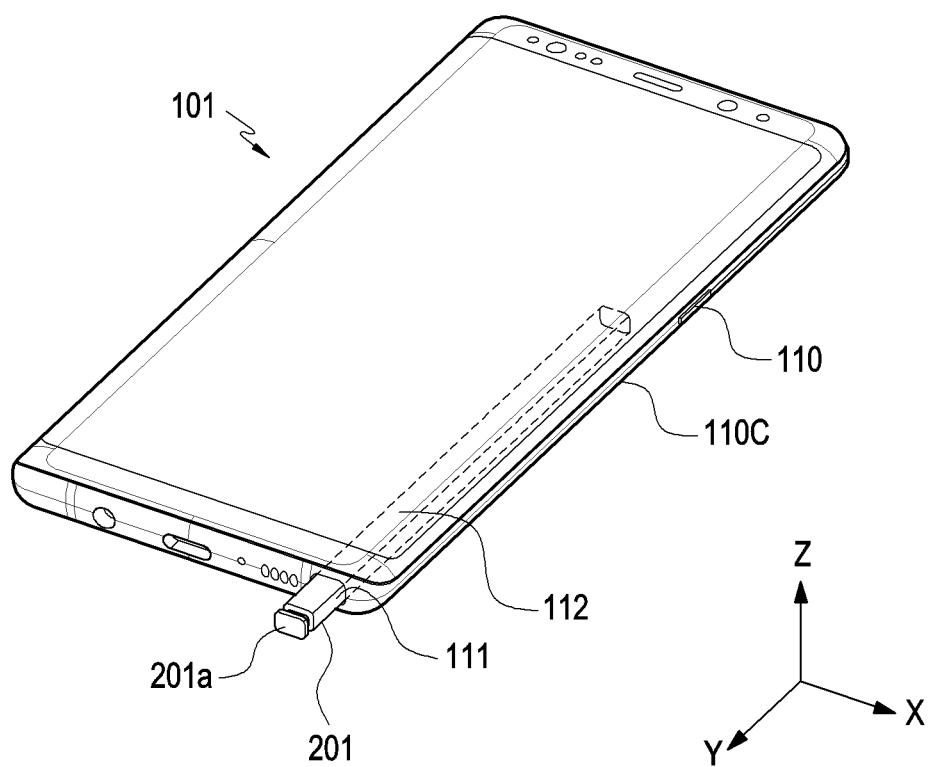
FIG. 2 is a view illustrating an electronic device including a pen input device, according to an embodiment.

FIG. 2 is a perspective view 200 of an electronic device 101 with a pen input device 201, according to an embodiment.

Referring to FIG. 2, the electronic device 101 has a structure for allowing the pen input device 201 to be inserted thereto. The electronic device 101 includes a housing 110 and has a hole 111 in a portion, e.g., a side portion, of the housing. The electronic device 101 includes a receiving space 112 connected to the hole 111, and the pen input device 201 may be inserted into the receiving space 112. The pen input device 201 has a pressable button 201a at an end to be easily pulled out of the receiving space 112 of the electronic device 101. When the button 201a is pressed, a repulsive mechanism (e.g., at least one spring) configured in association with the button 201a may be operated to allow the pen input device 201 to be removed from the receiving space 112.

Figure 3:
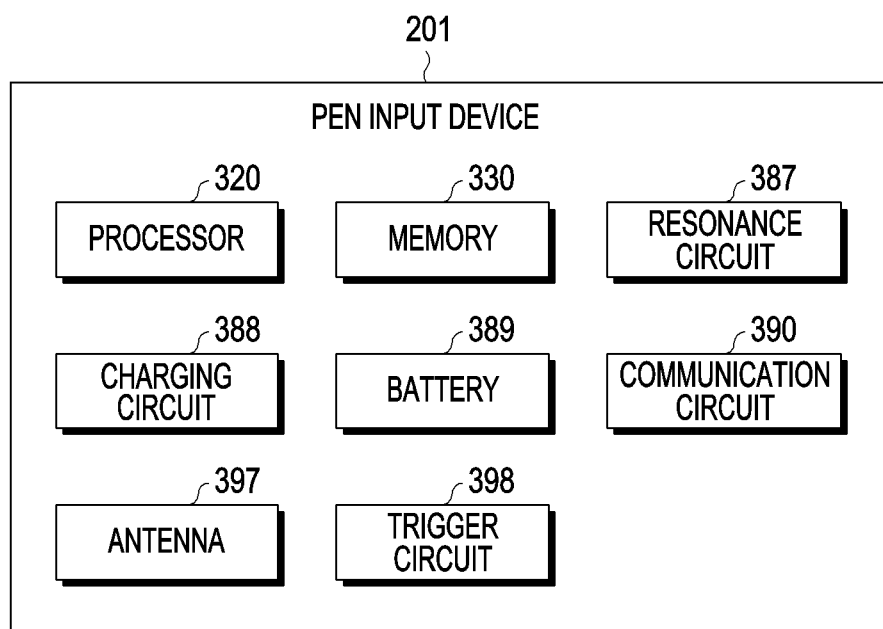
FIG. 3 is a view illustrating a pen input device, according to an embodiment.

FIG. 3 is a view illustrating a pen input device 201, according to an embodiment.

Referring to FIG. 3, the pen input device 201 includes a processor 320, a memory 330, a resonance circuit 387, a charging circuit 388, a battery 389, a communication circuit 390, an antenna 397, and/or a trigger circuit 398. The processor 320, at least part of the resonance circuit 387, and/or at least part of the communication circuit 390 of the pen input device 201 may be configured in the form of a chip or on a printed circuit board. The processor 320, the resonance circuit 387, and/or the communication circuit 390 may be electrically connected with the memory 330, the charging circuit 388, the battery 389, the antenna 397, or the trigger circuit 398. The pen input device 201 may only include a resonance circuit and a button.

The processor 320 may include a customized hardware module or a generic processor configured to execute software (e.g., an application program). The processor may include a hardware component (function) or software element (program) including at least one of a communication module or a module to manage the state or environment of the pen input device 201, an input/output interface, a data measuring module, and various sensors provided in the pen input device 201. The processor 320 may include one of, e.g., hardware, software, or firmware, or a combination of two or more thereof. The processor 320 may receive a proximate signal corresponding to an electromagnetic signal generated from a digitizer (e.g., the electromagnetic induction panel 490) of the electronic device 101 through the resonance circuit 387. When the proximate signal is identified, the processor 320 may control the resonance circuit 387 to transmit an electromagnetic resonance (EMR) input signal to the electronic device 101.

The memory 330 may store information related to the operation of the pen input device 201. For example, the information may include information for communicating with the electronic device 101 and frequency information related to the input operation of the pen input device 201.

The resonance circuit 387 may include at least one of a coil, an inductor, or a capacitor. The resonance circuit 387 may be used for the pen input device 201 to generate a signal having a resonance frequency. For example, to generate the signal, the pen input device 201 may use at least one of an EMR scheme, an active electrostatic (AES) scheme, or an electrically coupled resonance (ECR) scheme. When the pen input device 201 transmits signals via the EMR scheme, the pen input device 201 may generate a signal having a resonance frequency based on an electromagnetic field generated from the inductive panel of the electronic device 101. When the pen input device 201 transmits signals via the AES scheme, the pen input device 201 may generate a signal using a capacitive coupling with the electronic device 101. When the pen input device 201 transmits signals via the ECR scheme, the pen input device 201 may generate a signal having a resonance frequency based on an electric field generated from a capacitive device of the electronic device. The resonance circuit 387 may be used to vary the frequency or strength of the electromagnetic field according to the user's manipulation state. For example, the resonance circuit 387 may provide a frequency to recognize a hovering input, drawing input, button input, or erasing input.

When connected with the resonance circuit 387 based on a switching circuit, the charging circuit 388 may rectify a resonance signal generated from the resonance circuit 387 into a direct current (DC) signal and provide the DC signal to the battery 389. The pen input device 201 may identify whether the pen input device 201 is inserted into the electronic device 101 using a voltage level of a DC signal sensed by the charging circuit 388.

The battery 389 may be configured to store power required for operation of the pen input device 201. The battery 389 may include a lithium-ion battery or a capacitor and may be recharged or replaced. The battery 389 may be charged with power (e.g., a DC signal for DC power) received from the charging circuit 388.

The communication circuit 390 may be configured to perform wireless communication between the pen input device 201 and the communication module 190 of the electronic device 101. The communication circuit 390 may transmit input information and state information about the pen input device 201 to the electronic device 101 using a short-range communication scheme. For example, the communication circuit 390 may transmit direction information (e.g., motion sensor data) about the pen input device 201 obtained through the trigger circuit 398, voice information entered through the microphone, or remaining power information about the battery 389 to the electronic device 101. The short-range communication scheme may include at least one of a Bluetooth low energy (BLE) communication or communication on a wireless local area network (WLAN).

The antenna 397 may be used to transmit signals or power to the outside (e.g., to the electronic device 101) or receive signals or power from the outside. The pen input device 201 may include a plurality of antennas and may select at least one antenna 397 appropriate for a communication scheme among the plurality of antennas. The communication circuit 390 may exchange signals or power with an external electronic device through the at least one selected antenna 397.

The trigger circuit 398 may include at least one button or sensor circuit. The processor 320 may determine the input scheme (e.g., touch or press) or type (e.g., an EMR button or a BLE button) of the button of the pen input device 201. The sensor circuit may generate an electrical signal or data value corresponding to an internal operating state or external environmental state of the pen input device 201. The sensor circuit may include at least one of a motion sensor, a remaining battery sensor, a pressure sensor, a light sensor, a temperature sensor, a geomagnetic sensor, or a biometric sensor. The trigger circuit 398 may transmit a trigger signal to the electronic device 101 using a signal through a sensor or a button input signal.

Figure 4:
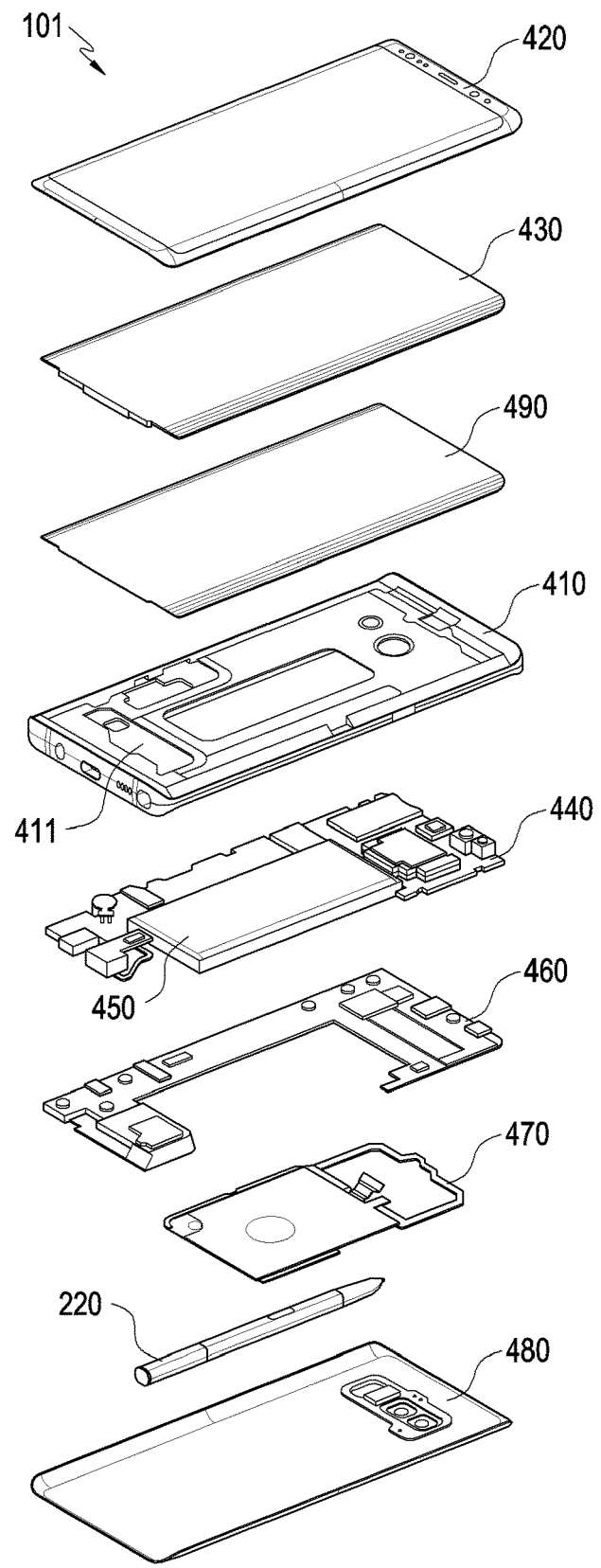
FIG. 4 is a view illustrating an electronic device, according to an embodiment.

FIG. 4 is a view illustrating an electronic device 101, according to an embodiment.

Referring to FIG. 4, an electronic device 101 includes a side bezel structure 410, a first supporting member 411 (e.g., a bracket), a front plate 420, a display 430, an electromagnetic induction panel 490, a printed circuit board (PCB) 440, a battery 450, a second supporting member 460 (e.g., a rear case), an antenna 470, a pen input device 201, and a rear plate 480. The electronic device 101 may exclude at least one (e.g., the first supporting member 411 or the second supporting member 460) of the components or may add other components.

The electromagnetic induction panel 490 (e.g., a digitizer) may detect input by the pen input device 201. The electromagnetic induction panel 490 may include a flexible printed circuit board (FPCB) and a shielding sheet. The shielding sheet may prevent inter-component interference by an electromagnetic field produced from the components (e.g., the display module, the PCB, or the electromagnetic induction panel) included in the electronic device 101. The shielding sheet may shield off electromagnetic fields produced from the components, thereby allowing an input from the pen input device 201 to be precisely delivered to the coil included in the electromagnetic induction panel 490. The electromagnetic induction panel 490 may include an opening formed in at least a portion corresponding to the biometric sensor embedded in the electronic device 101.

The first supporting member 411 may be disposed inside the electronic device 101 to be connected with the side bezel structure 410 or integrated with the side bezel structure 410. The first supporting member 411 may be formed of a metal and/or a non-metallic material (e.g., a polymer). The display 430 may be joined onto one surface of the first supporting member 411, and the PCB 440 may be joined onto the opposite surface of the first supporting member 311. A processor 120, a memory 130, and/or an interface may be mounted on the PCB 440. The processor may include one or more of a central processing unit, an application processor, a graphic processing device, an image signal processor, a sensor hub processor, or a communication processor.

The memory 130 may include a volatile or a non-volatile memory.

The interface may include a high definition multimedia interface (HDMI), a USB interface, an SD card interface, and/or an audio interface. The interface may electrically or physically connect the electronic device 101 with an external electronic device and may include a USB connector, an SD card/multi-media card (MMC) connector, or an audio connector.

The battery 450 may be a device for supplying power to at least one component of the electronic device 101. The battery 450 may include a primary cell which is not rechargeable, a secondary cell which is rechargeable, or a fuel cell. At least a portion of the battery 450 may be disposed on substantially the same plane as the PCB 440. The battery 450 may be integrally or detachably disposed inside the electronic device 101.

The antenna 470 may be disposed between the rear plate 480 and the battery 450. The antenna 470 may include a near-field communication (NFC) antenna, a wireless charging antenna, and/or a magnetic secure transmission (MST) antenna. The antenna 470 may perform short-range communication with an external device or may wirelessly transmit or receive power necessary for charging. An antenna structure may be formed by a portion or combination of the side bezel structure 410 and/or the first supporting member 411.

Figure 5:
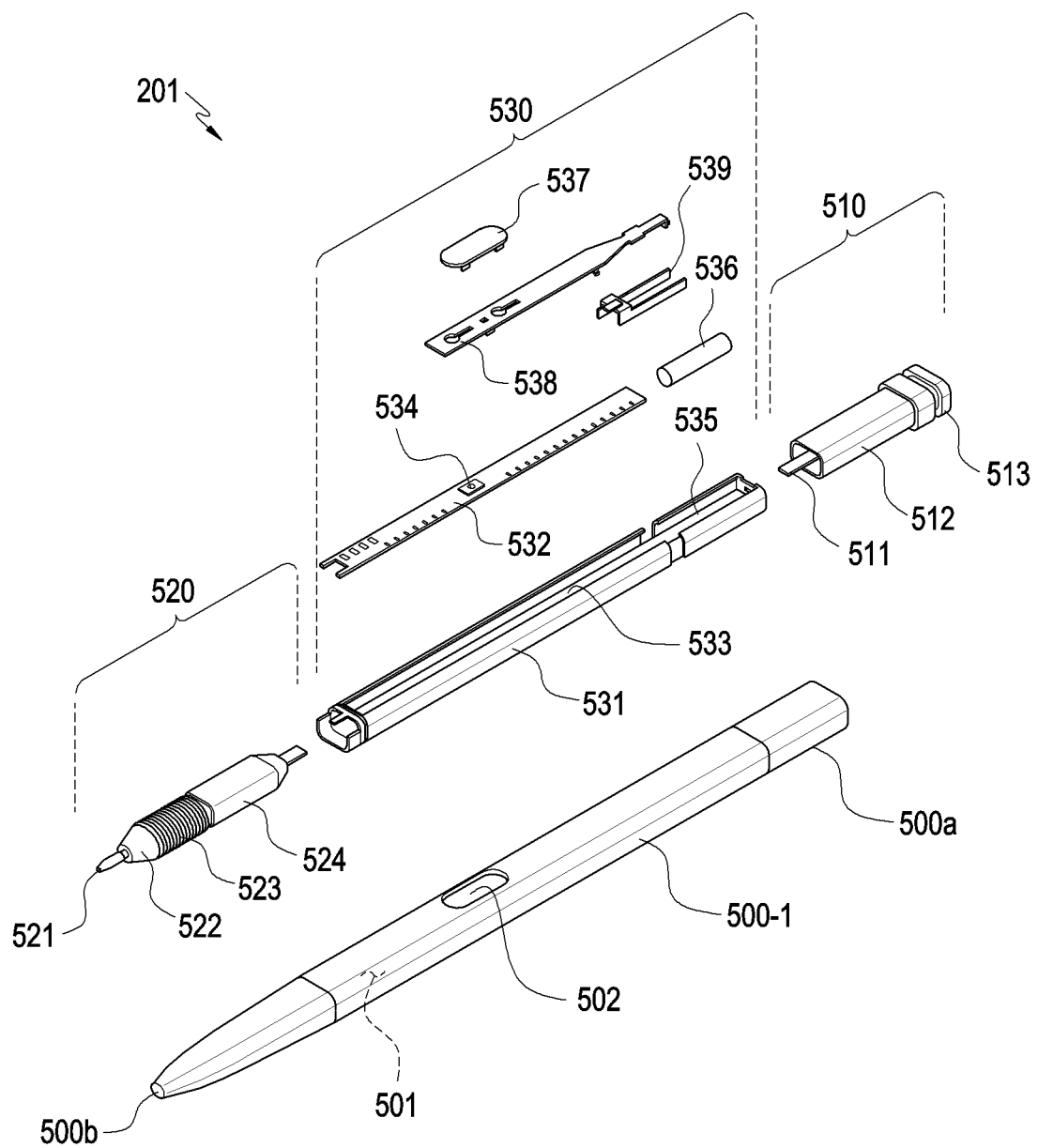
FIG. 5 is an exploded perspective view illustrating a pen input device, according to an embodiment.

FIG. 5 is an exploded perspective view 500 of a pen input device 201 according to an embodiment.

Referring to FIG. 5, the pen input device 201 includes a pen housing 500-1 forming the outer appearance of the pen input device 201 and an inner assembly inside the pen housing 500-1. The inner assembly may include all of several parts mounted inside the pen and may be inserted into the pen housing 500-1 by a single assembly operation.

The pen housing 500-1 includes an elongated receiving space 501 between a first end 500a and a second end 500b. The cross section of the pen housing 500-1 may be shaped as an ellipse with a longer axis and a shorter axis and may overall be shaped as an elliptical cylinder. Corresponding to the shape of the pen housing 500-1, the receiving space 112 of the electronic device 101 may also have an elliptical cross section. The pen housing 500-1 may include a synthetic resin (e.g., plastic) and/or a metal (e.g., aluminum). The second end 500b of the pen housing 500-1 may be formed of a synthetic resin.

The inner assembly may be elongated corresponding to the shape of the pen housing 500-1. The inner assembly may largely be divided into three components along the lengthwise direction. For example, the inner assembly may include an ejection member 510 disposed in the position corresponding to the first end 500a of the pen housing 500-1, a coil part 520 disposed in the position corresponding to the second end 500b of the pen housing 500-1, and a circuit board part 530 disposed in the position corresponding to the body of the housing.

The ejection member 510 may include a configuration to pull the pen input device 201 out of the receiving space 112 of the electronic device 101. The ejection member 510 includes a shaft 511, an ejection body 512 disposed around the shaft 511 to form the overall outer appearance of the ejection member 510, and a button part 513. When the inner assembly is fully inserted into the pen housing 500-1, the portion including the shaft 511 and the ejection body 512 may be surrounded by the first end 500a of the pen housing 500-1, and the button part 513 may be exposed to the outside of the first end 500a. A plurality of parts, e.g., cam members or elastic members, may be disposed in the ejection body 512 to form a push-pull structure. The button part 513 may substantially be coupled with the shaft 511 to linearly move back and forth along the ejection body 512. The button part 513 may include a button with a jaw to allow the user to pull out the pen input device 201 with his or her fingernail. The pen input device 201 may include a sensor to detect the linear motion of the shaft 511 to thereby provide another input scheme.

The coil part 520 may include a pen tip 521, which is exposed to the outside of the second end 500b when the inner assembly is fully inserted into the pen housing 500-1, a packing ring 522, a coil 523 wound multiple times, and/or a pen pressure sensor 524 to obtain variations in pressure when the pen tip 521 is pressurized. The packing ring 522 may include epoxy, rubber, urethane, or silicone, and may be provided for waterproof or dustproof purposes to protect the coil part 520 and the circuit board part 530 from water or dust. The coil 523 may form a resonance frequency within a preset frequency band (e.g., 500 kHz) and may be combined with at least one device (e.g., a capacitor) to adjust the resonance frequency produced by the coil 523 within a predetermined range.

The circuit board part 530 includes a PCB 532, a base 531 surrounding at least one surface of the PCB 532, and an antenna. A board seating part 533 may be formed on top of the base 531 to allow the PCB 532 to rest, and the PCB 532 may be seated and fastened onto the board seating part 533. The PCB 532 may include a top surface and a bottom surface. A variable capacitor or a switch 534 may be disposed on the top surface of the PCB 532, and a charging circuit, a battery 536, or a communication circuit may be disposed on the bottom surface of the PCB 532. The battery 536 may include an electric double layered capacitor (EDLC). The charging circuit may be positioned between the coil 523 and the battery 389 and may include a voltage detector circuit and a rectifier.

The antenna may include an antenna structure 539 as shown in FIG. 5 and/or an antenna embedded in the PCB 532. A switch 534 may be provided on the PCB 532. A side button 537 provided to the pen input device 201 may be used to press the switch 534 and may be exposed to the outside through a side opening 502 of the pen housing 500-1. The side button 537 may be supported by the supporting member 538 and, if no external force is applied to the side button 537, the supporting member 538 may provide an elastic restoration force to allow the side button 537 to remain or go back to a predetermined position.

The circuit board part 530 may include another packing ring such as an O-ring. For example, O-rings may be disposed at both ends of the base 531, thereby forming a sealing structure between the base 531 and the pen housing 500-1. The supporting member 538 may partially come in tight contact with the inner wall of the pen housing 500-1 around the side opening 502, thereby forming a sealing structure. The circuit board part 530 may also form a waterproof, dustproof structure similar to the packing ring 522 of the coil part 520.

The pen input device 201 includes a board seating part 535 on the top surface of the base 531 to allow the battery 536 to sit thereon. The battery 536 mountable on the board seating part 535 may include a cylinder-type battery.

The pen input device 201 may include a microphone connected directly to the PCB 532 or to an FPCB connected with the PCB 532. The microphone may be disposed in a position parallel with the side button 537 along the longer direction of the pen input device 201.

Figure 6:
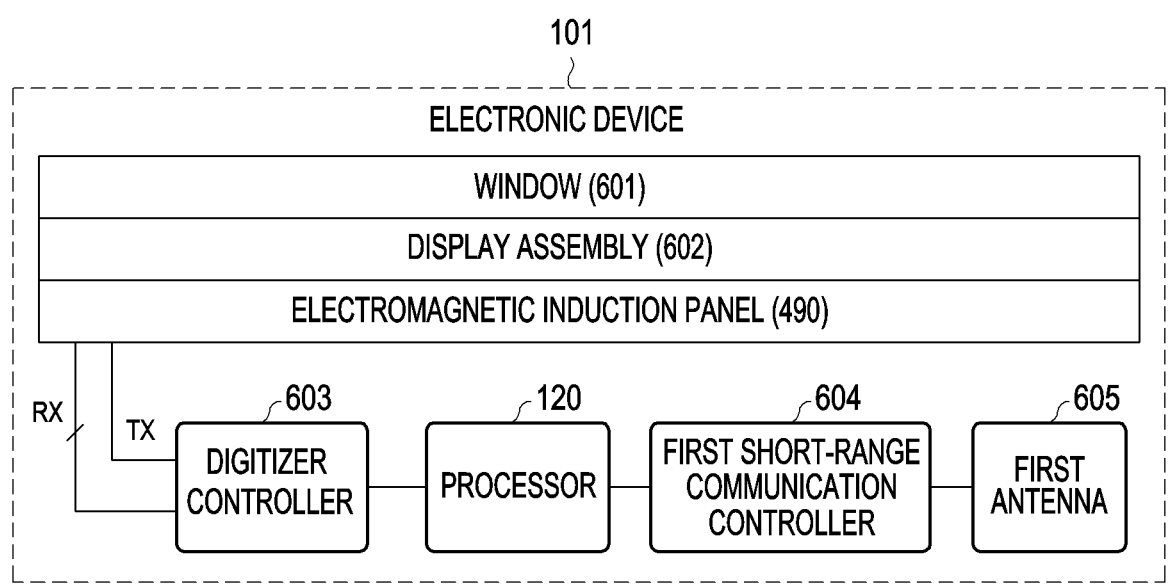
FIG. 6 is a view illustrating an electronic device, according to an embodiment.

FIG. 6 is a view illustrating an electronic device 101, according to an embodiment.

Referring to FIG. 6, the electronic device 101 includes at least one of a window 601, a display assembly 602, an electromagnetic induction panel 490 (e.g., a digitizer), a first short-range communication controller 604 (e.g., the wireless communication module 192), a first antenna 605 (e.g., the antenna module 197), a digitizer controller 603, a detecting coil, and a processor 120.

The window 601 may be formed of a material (e.g., glass) to protect the display assembly 602 from external impacts. The window 601 may be coupled (e.g., attached) with the display assembly 602 in the form of covering the whole area of the display assembly 602.

The display assembly 602 may visually provide information to the outside (e.g., to the user) of the electronic device 101. The display assembly 602 may include a display, a hologram device, a projector, and a control circuit to control the device. The display assembly 602 may include touch circuitry adapted to detect a touch, or sensor circuitry (e.g., a pressure sensor) adapted to measure the intensity of force incurred by the touch.

The electromagnetic induction panel 490 may output a signal (e.g., an electromagnetic field) to identify the position of a pen input device (e.g., the pen input device 201 of FIG. 4).

The first short-range communication controller 604 may transmit and receive signals to form a wireless communication connection with a wireless communication module of an external electronic device with which it attempts to establish a wireless communication (e.g., short-range communication) connection. The first short-range communication controller 604 may perform communication with the external electronic device (e.g., the pen input device 201 of FIG. 4) using the wireless communication connection. The short-range communication may include wireless fidelity (Wi-Fi), Wi-Fi direct, Bluetooth, BLE, or NFC.

The first antenna 605 may be operatively connected with the first short-range communication controller 604, and may transmit a signal received from the first short-range communication controller 604 to the external electronic device. The first antenna 605 may receive signals from the external electronic device.

The digitizer controller 603 may be operatively connected with the electromagnetic induction panel 490, a detecting coil, or the processor 120. The digitizer controller 603 may transmit a detection signal to a coil 523 of the external electronic device using the detecting coil. The digitizer controller 603 may transmit the detection signal by generating a magnetic field which varies over time using the detecting coil to generate (or induce) an electromagnetic force (or induced current) at the coil 523 of the external electronic device. The detection signal may be an electromagnetic field signal with a designated frequency to identify whether the external electronic device is positioned on the touchscreen or received inside the internal space (e.g., the receiving space 122 of FIG. 2) of the electronic device 101. The digitizer controller 603 may receive a response signal from a coil 523 of the external electronic device using the detecting coil. An induced current may be produced (or induced) at or around the detecting coil by a variation in the magnetic field from the external electronic device. Thus, the digitizer controller 603 may receive the response signal. The electronic device (e.g., the processor 120 or the digitizer controller 603) may identify the position of the external electronic device with respect to the electronic device 101 based on the response signal. For example, the electronic device 101 may include a detecting coil in each of the inside of the electromagnetic induction panel 490 and the internal space of the electronic device 101.

The electronic device (e.g., the processor 120 or the digitizer controller 603) may identify the position of the pen input device based on whether an induced current occurs from at least one of the detecting coil included in the inside of the electromagnetic induction panel 490 or the detecting coil included in the internal space. The electronic device may determine whether the pen input device 201 is positioned on the display (e.g., the pen input device 201 contacts or is positioned close to the display device 160) or is inserted in the internal space of the electronic device 101 based on the position of the detecting coil which produces (or induces) an induced (or produced) current by a magnetic field from the pen input device (e.g., a coil). When no induced current is produced from the detecting coil included in the internal and the detecting coil included in the electromagnetic induction panel 490 or an induced current generated therefrom has a strength smaller than a preset strength (i.e., strength threshold), the electronic device (e.g., the processor 120 of FIG. 1 or the digitizer controller 603) may determine that the pen input device is positioned a designated distance or more away from the electronic device 101.

The digitizer controller 603 may wirelessly transmit power to the external electronic device using the detecting coil. For example, the digitizer controller 603 may wirelessly transmit power to the external electronic device by generating (or inducing) an induced current at the coil 523 of the external electronic device using the detecting coil.

The detecting coil may be operatively connected with the digitizer controller 603 or the electromagnetic induction panel 490. The detecting coil may generate a current (e.g., a detecting signal or a current to charge an external electronic device (e.g., the battery 706 of FIG. 7) at the coil 523 of the external electronic device) based on mutual induction by the digitizer controller 603. The detecting coil may transfer, to the digitizer controller 603, a current (e.g., a response signal) induced and generated by the magnetic field generated from the coil 523 of the external electronic device.

The processor 120 may be operatively connected with the digitizer controller 603 or the first short-range communication controller 604, and may control the components included in the electronic device 101 or monitor the state of the components. The processor 120 may control the electromagnetic induction panel 490 which is provided adjacent the display device 160 through the digitizer controller 603 and obtain a signal received from an external electronic device (e.g., the pen input device 201 of FIG. 4 or the electronic device 120 of FIG. 1). The digitizer controller 603 may include an independent control circuit to be able to control the processing time of electrical signals input to or output from the electromagnetic induction panel 490 without control by the processor 120. The processor 120 may control the electronic device 101 to transmit electrical or magnetic signals to the external electronic device or receive electrical or magnetic signals from the external electronic device using the detecting coil. The processor 120 may determine position information about the pen input device 201 (e.g., the state in which the pen input device 201 is inserted in the internal space of the electronic device 101 or contacts, or is positioned close to, the display device 160) or state information about the pen input device 201 (e.g., remaining battery information or connection state information about the pen input device 201) using a signal received from the pen input device 201. The processor 120 may provide power to the pen input device 201 based on position information about the pen input device 201. The processor 120 may display battery information or connection state information about the pen input device 201 on the display device 160 based on the state information about the pen input device 201. The processor 120 may control the first short-range communication controller 604 to form a wireless communication connection with the pen input device (e.g., the second short-range communication controller 709 of FIG. 7). When the pen input device 201 is inserted into the internal space, the processor 120 may repeat providing power to the pen input device 201 during a first designated time (e.g., 9 seconds) using the digitizer controller 603 and stop providing power during a second designated time (e.g., 1 second).

Figure 7:
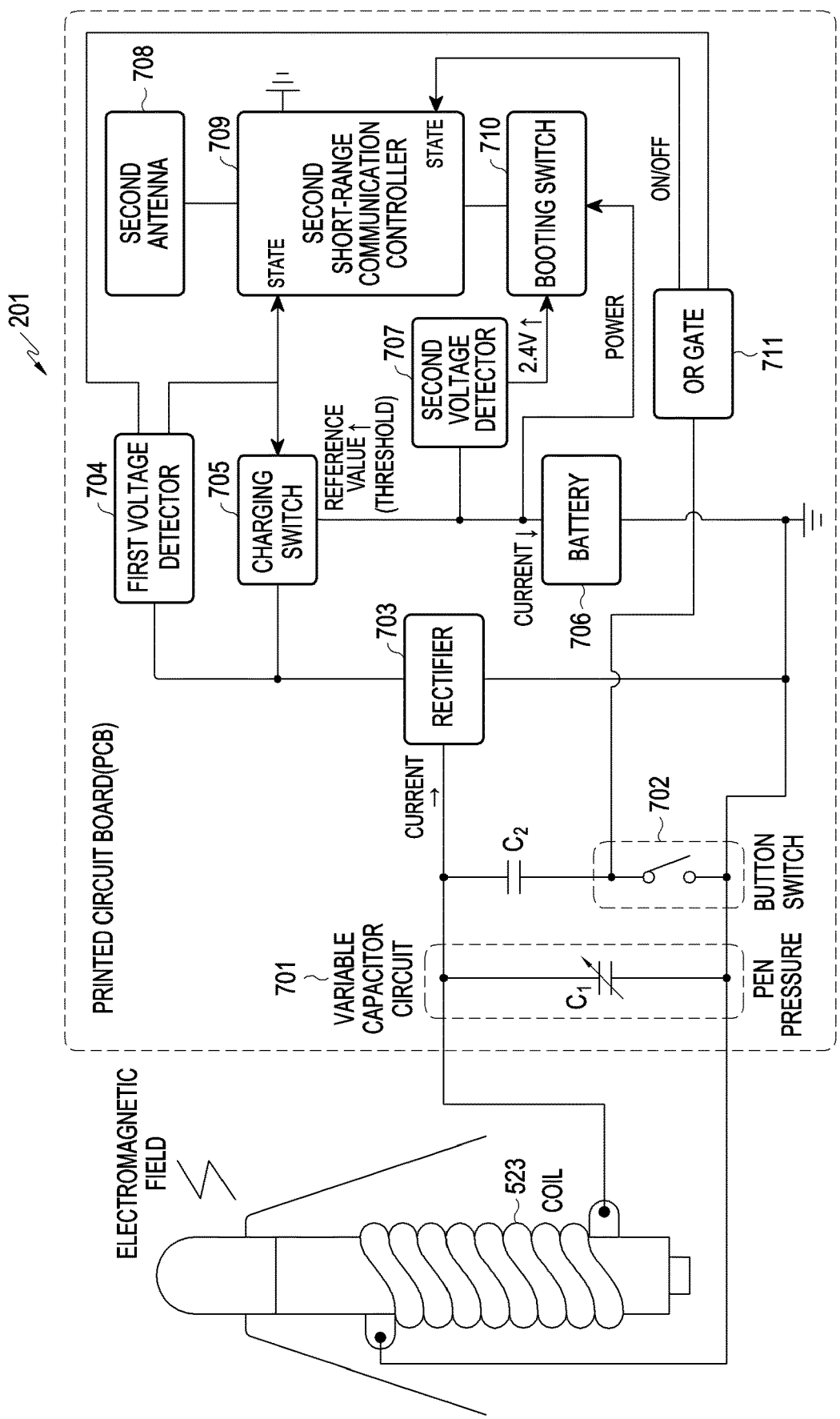
FIG. 7 is a view illustrating a pen input device, according to an embodiment.

FIG. 7 is a view 700 illustrating the pen input device 201, according to an embodiment.

Referring to FIG. 7, the pen input device 201 includes at least one of a coil 523, a variable capacitor circuit 701, a button switch 702, a rectifier 703, a first voltage detector 704, a charging switch 705, a battery 706, a second voltage detector 707, a second antenna 708, a second short-range communication controller 709 (e.g., the communication circuit 390 of FIG. 3), a booting switch 710, or an OR gate 711.

The coil 523 may be connected to be able to operate with the variable capacitor circuit 701. The coil 523 may transfer a current (e.g., a detection signal or a current to charge the external electronic device (e.g., the pen input device 201 of FIG. 4)) generated from the electronic device 101 based on mutual induction to the variable capacitor circuit 701.

The variable capacitor circuit 701 may be a circuit which may have a variable capacitance and may include at least one of one or more capacitors, one or more transistors, one or more input/output ports, or logic circuits.

The button switch 702 may be operatively connected with at least one of the rectifier 703 or the OR gate 711. The button switch 702 may be shorted or opened as the button (e.g., the switch 534 of FIG. 5) provided in the pen input device 201 is pressed or touched. When the button switch 702 is shorted as the button is pressed, the node OR-gate connected with the capacitor C2 may be grounded. When the button switch 702 is open as pressing of the button is released, the capacitor C2 may be connected in series with the OR gate. This may lead to a difference in the resonance frequency of the resonance circuit 387 formed by the coil 523 and the connected capacitors between when the button is pressed and when the button is not pressed. The electronic device 101 may determine whether the button of the pen input device 201 is pressed or not by identifying the frequency of the signal generated from the resonance circuit 387 of the pen input device 201.

The rectifier 703 may be operatively connected with at least one of the button switch 702, the first voltage detector 704, or the charging switch 705. The rectifier 703 may rectify alternating current (AC) power received from the electronic device 101 and convert current from the coil 523 into DC power and transfer the DC power to at least one of the first voltage detector 704 or the charging switch 705.

The first voltage detector 704 may be operatively connected with at least one of the rectifier 703, the charging switch 705, the second short-range communication controller 709, or the OR gate 711. The first voltage detector 704 may detect a voltage value on the path connecting the rectifier 703 and the second short-range communication controller 709. The first voltage detector 704 may detect whether the magnitude of the detected voltage belongs to a designated range based on the magnitude of the detected voltage value. The designated range may be divided into a specific range, e.g., from 1.5V to 3.5V (level 1 range) or a range not less than 3.5V (level 2 range). For example, when the magnitude of the detected voltage belongs to the level 2 range, it may indicate that the pen input device 201 is inserted in the internal space of the electronic device 101. When the magnitude of the detected voltage belongs to the level 1 range, it may indicate that the pen input device 201 is being used (e.g., touching) by the user on the display device 160 of the electronic device 101. When the magnitude of the detected voltage belongs to the level 2 range, the first voltage detector 704 may apply an enable signal to the charging switch 705 to turn on the charging switch 705 to allow the charging signal transmitted from the rectifier 703 to be applied to the battery 706. When the magnitude of the detected voltage belongs to the level 1 range, the first voltage detector 704 may control the charging switch 705 to turn, or remain, off. The first voltage detector 704 may transfer the DC power from the rectifier 703 to the charging switch 705.

When the magnitude of the detected voltage belongs to the level 2 range, the first voltage detector 704 may apply an enable signal to the second short-range communication controller 709. In this case, the second short-range communication controller 709 may transmit a wireless signal (e.g., an advertising signal or message) to the first short-range communication controller 604 of the electronic device. When the magnitude of the detected voltage belongs to the level 1 range, the first voltage detector 704 may not apply an enable signal to the second short-range communication controller 709. The enable signal may be of the same or a different type from the enable signal that the first voltage detector 704 applies to the charging switch 705.

The first voltage detector 704 may include a conducting line between the first voltage detector 704 and the second short-range communication controller 709 to transmit, to the second short-range communication controller 709, a signal related to the above-described state of the pen input device (e.g., the state in which the stylus pen is inserted into the internal space of the electronic device 101 or touches the display device 160 of the electronic device 101 by the user. The charging switch 705 may be connected via the conducting line with the second short-range communication controller 709 and, when the charging switch 705 turns on, transfer the enable signal from the first voltage detector 704 to the second short-range communication controller 709.

The charging switch 705 may be operatively connected with the rectifier 703, the first voltage detector 704, the battery 706, the second voltage detector 707, and the second short-range communication controller 709. The charging switch 705 may be turned on (e.g., shorted) or off (e.g., opened) based on the strength of the voltage detected by the first voltage detector 704. When the charging switch 705 is in the on state, the DC power transferred from the rectifier 703 or the first voltage detector 704 may be applied to the battery 706 or the second voltage detector 707. In this case, the second short-range communication controller 709 may determine that the pen input device 201 is in the state of being charged by the electronic device 101. When the charging switch 705 is in the off state, the DC power transferred from the rectifier 703 or the first voltage detector 704 may not be applied to the battery 706 or the second voltage detector 707. In this case, the second short-range communication controller 709 may determine that the pen input device 201 is in a non-charging state. The non-charging state may mean a state in which the pen input device 201 is not inserted in the internal space of the electronic device 101 and thus does not receive AC power from the electronic device 101 (e.g., the coil 523 of the electronic device 101).

The second voltage detector 707 may be connected to be able to operate with at least one of the charging switch 705, the battery 706, or the booting switch 710. The second voltage detector 707 may detect a voltage value output from the battery 706. The booting switch 710 may be shorted based on the magnitude of the voltage value detected by the second voltage detector 707. In this case, the second short-range communication controller 709 may be booted. "booting" may mean cold booting, which is performed when the voltage value detected by the second voltage detector 707 is greater than a designated value (e.g., 2.4V).

The second short-range communication controller 709 may establish a short-range communication (e.g., BLE) connection with the electronic device 101. The second short-range communication controller 709 may perform pairing with the electronic 101 using a short-range wireless communication scheme, e.g., BLE. The second short-range communication controller 709 may send state information about the battery 706 to the paired electronic device 101. The second short-range communication controller 709 may transmit and receive, with the paired electronic device 101, signals to control at least one component included in the pen input device 201 or the electronic device 101.

The OR gate 711 may generate a signal to disregard the button input made by the user or a signal to execute an application on the electronic device 101 using short-range communication based on the voltage value detected by the first voltage detector 704. The OR gate 711 may transmit the signal to the second short-range communication controller 709.

The electronic device 101 may perform various functions, e.g., photo taking, switch between front camera capture mode and rear camera capture mode, and running the camera application, based on a signal transmitted from the pen input device 201 connected via short-range wireless communication with the electronic device 101. For example, upon identifying a single press on a button part 201a or the side button 537 while the camera application is running, the electronic device 101 may capture the object being displayed on the execution screen (e.g., a preview screen) of the camera application. In the following example, a preview screen including various graphical objects related to capturing the object and a preview image corresponding to the object is described as the execution screen of the camera application. The size of the preview screen may be substantially the same as the size of the display device 160.

Upon identifying a double press on a button part 201a or the side button 537 while the camera application is running, the electronic device 101 may perform a switch between the front camera capture mode and the rear camera capture mode. Upon identifying a long press on a button part 201a or the side button 537 while the camera application is not running, the electronic device 101 may execute the camera application. Upon identifying a single press on a button part 201a or the side button 537 while recording a video, the electronic device 101 may temporarily stop or terminate the video recording. Upon identifying a single press on a button part 201a or the side button 537 while the camera application is running, the electronic device 101 may identify the log information about the camera application and execute the function which has been used most frequently during a designated period. Various functions or operations performed by a single, double, and long press may be changed (e.g., reset) by the user.

Figure 8:
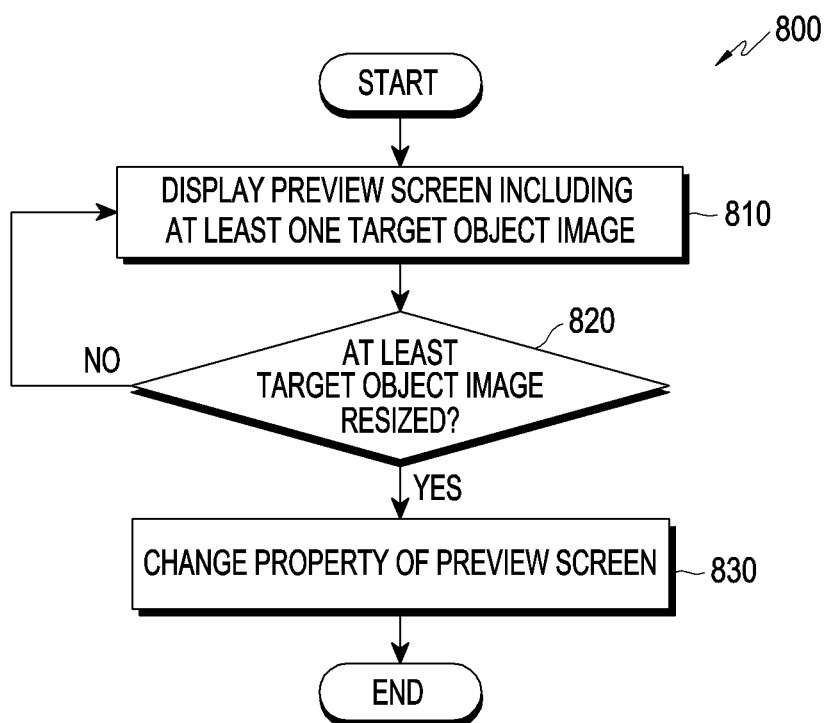
FIG. 8 is a flowchart illustrating a method of operating an electronic device, according to an embodiment.

FIG. 8 is a flowchart illustrating a method 800 of operating an electronic device 101, according to an embodiment.

Referring to FIG. 8, the method of operating the electronic device 101 (e.g., by operating the processor 120 of FIG. 1) displays a preview screen including at least one target object image using a display device 160 in step 810. At least one target object image may include an image for the user of the electronic device 101, who holds a pen input device. The user may hold or carry or a pen input device 201. The user of the electronic device 101 may take a selfie using the camera module 180 on the front surface (i.e., a portion where at least part of the display device 160 is exposed) of the electronic device 101. The user of the electronic device 101 may capture an object using the camera module 180 on the rear surface (i.e., the surface facing away from the front surface) of the electronic device 101.

The electronic device 101 (including the processor 120 of FIG. 1) determines whether at least one target object image is resized in step 820. The electronic device 101 may determine whether the at least one target object image is resized based on how much at least part (e.g., the user's face) of the target object image is resized.

Upon identifying a resizing of the at least one target object image (yes in step 820), the electronic device 101 changes the properties of the preview screen in step 830. Upon identifying no resizing of the at least one target object image (no in step 820), the electronic device 101 may keep on displaying the current preview screen without changing the properties of the preview screen.

FIGS. 9A to 9L illustrate operations of controlling a preview screen 910 of a camera application depending on the distance between an electronic device 101 and a pen input device (or the user who holds the pen input device), according to an embodiment.

Figure 9A:
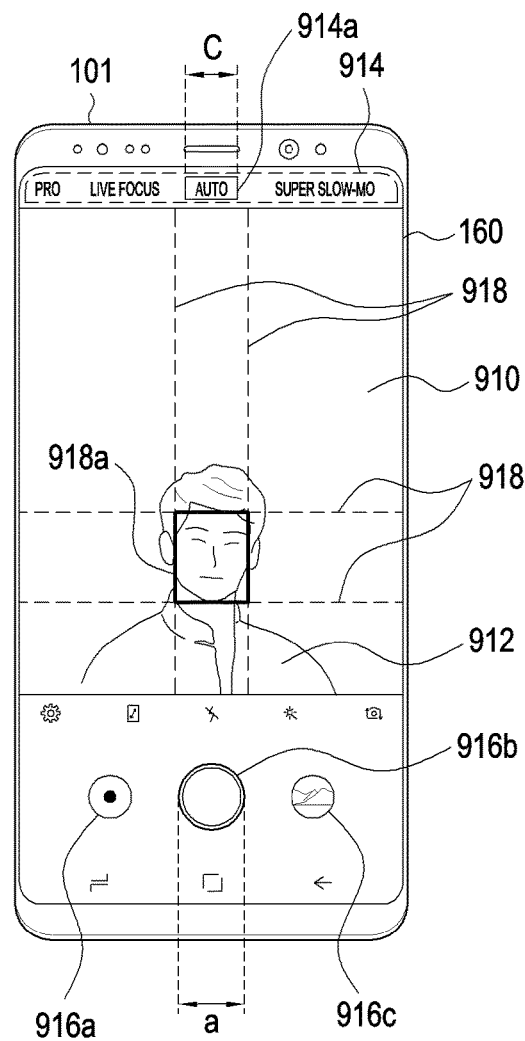
FIGS. 9A, 9B, 9C, 9D, 9E, 9F, 9G, 9H, 9I, 9J, 9K, and 9L are views illustrating operations of controlling an execution screen (e.g., a preview screen) of a camera application depending on a distance between an electronic device and a pen input device, according to various embodiments.

Referring to FIG. 9A, the electronic device 101 displays a preview screen 910 on the display device 160. The preview screen 910 includes at least one of a preview image including a target object image 912, capture types 914, a video recording button 916a, a still image capture button 916b, and a run button 916c for executing a gallery application. The preview image may include an image obtained by the camera and displayed on the display device 160. Upon receiving a selection input (e.g., a touch input) on the capture button 916b from the user or receiving a capture signal from a pen input device 201 connected with the electronic device 101 via short-range wireless communication (e.g., BLE), the electronic device 101 may store the preview image (e.g., the image obtained by the camera) included in the preview screen 910 currently being displayed on the electronic device 101 as a captured image. The captured image may mean an image which is actually stored in the memory of the electronic device 101 according to the user's capture input. The electronic device 101 may determine the size of the target object image 912 and may determine a resizing of the target object image 912 using a resizing of a portion (e.g., the user's face) of the target object image 912. The electronic device 101 may set a virtual line 918 on the preview screen 910 and may determine a resizing of the target object image 912 based on the ratio of the area corresponding to the portion of the target object image 912 to the whole preview screen 910. The virtual line 918 and the line 918a indicating the facial area may not be displayed on the preview screen 910. The electronic device 101 may previously store information (e.g., a lookup table) about the correspondence between the distance between the electronic device 101 and the pen input device 201 and the ratio of the area corresponding to the portion of the target object image 912 to the whole preview screen 910. The electronic device 101 may identify the actual distance between the electronic device 101 and the pen input device using the stored correspondence information. FIG. 9A illustrates an example of displaying buttons 916a, 916b, and 916c and capture types 914 with default sizes (a and c) on a preview screen 910. Various techniques may be applied to identify the size of a portion (e.g., the user's face) of the target object image 912.

Figure 9B:
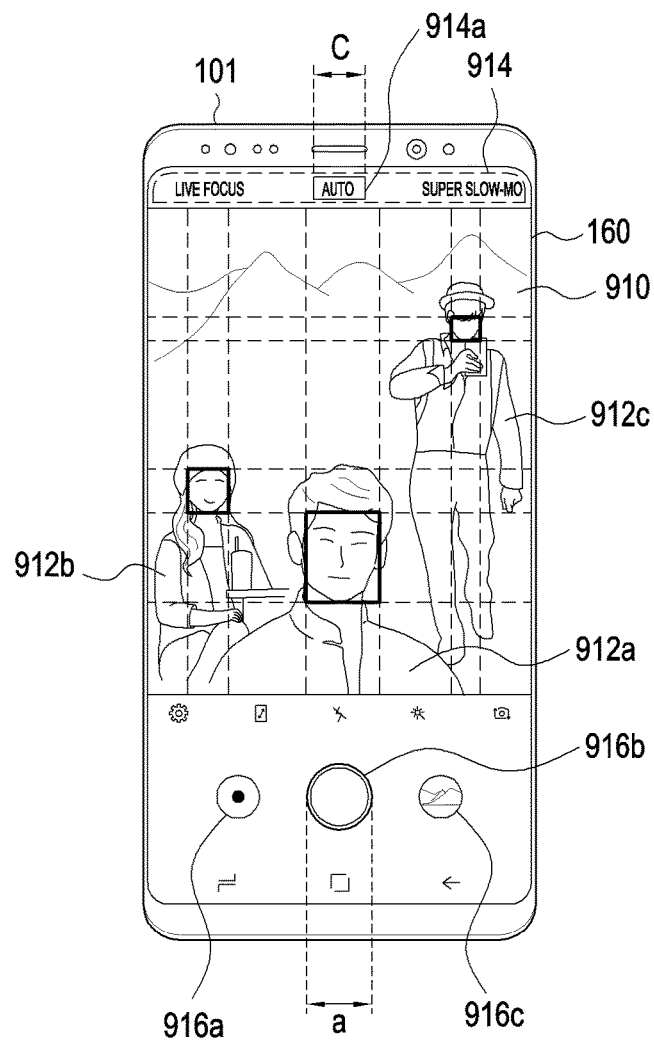

Referring to FIG. 9B, when the preview screen 910 includes a plurality of target object images (a first target object image 912a, a second target object image 912b, and a third target object image 912c), the electronic device 101 may determine whether the target object images have been resized with reference to FIG. 9B by considering the size of any one target object image (e.g., the first target object image 912a) mostly occupying the preview screen 910. The electronic device 101 may set any one target object image (e.g., the first target object image 912a), which mostly occupies the preview screen at a particular time (e.g., the time when the target object images for the plurality of objects are first displayed on the preview screen), to a reference image for determining a resizing of the target object images. The electronic device 101 may determine a resizing of the plurality of target object images (the first target object image 912a, the second target object image 912b, and the third target object image 912c) according to a resizing of the target object image (e.g., the first target object image 912a) set to the reference image. The electronic device 101 may determine which one of the target object images mostly occupies the preview screen at each of a plurality of times. In other words, determination of the reference image may be updated at each of the plurality of times by the electronic device 101.

Figure 9C:
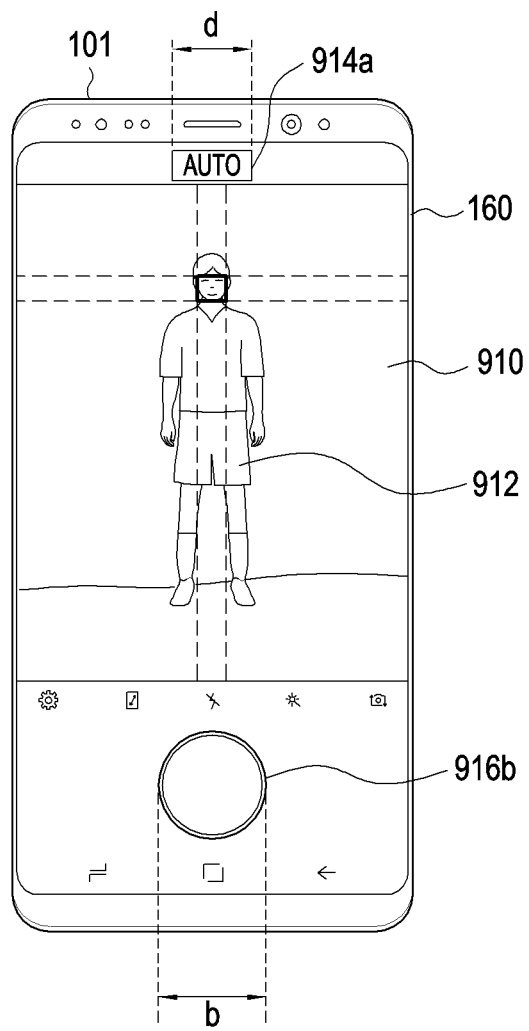

Referring to FIG. 9C, upon identifying that the target object image 912 shrinks, the electronic device 101 may perform control to display the capture button 912b in an increased size b according to a predesignated ratio. Size b may be larger (in diameter) than size a. When the target object image 912 shrinks, the electronic device 101 may perform display at least one of the capture types 914 (e.g., an AUTO capture type) in an increased size d. Size d may be larger (in length) than size c. When the target object image 912 shrinks, the electronic device 101 may refrain from displaying at least one button (e.g., the video recording button 916a and the run button 916c) on the preview screen 910. In addition, when the target object image 912 shrinks, the electronic device 101 may refrain from displaying other capture type(s) than the capture type (e.g., the AUTO capture type) currently set among the capture types 914 on the preview screen 910. When the ratio of a portion (e.g., the face) of the target object image 912 to the preview screen 910 is a threshold (e.g., 3.2% of the entire area of the preview screen 910 or the display device 160) or less, the electronic device 101 may determine that the target object image 912 has shrunk. The threshold may be varied and there may be a plurality of thresholds.

Figure 9D:
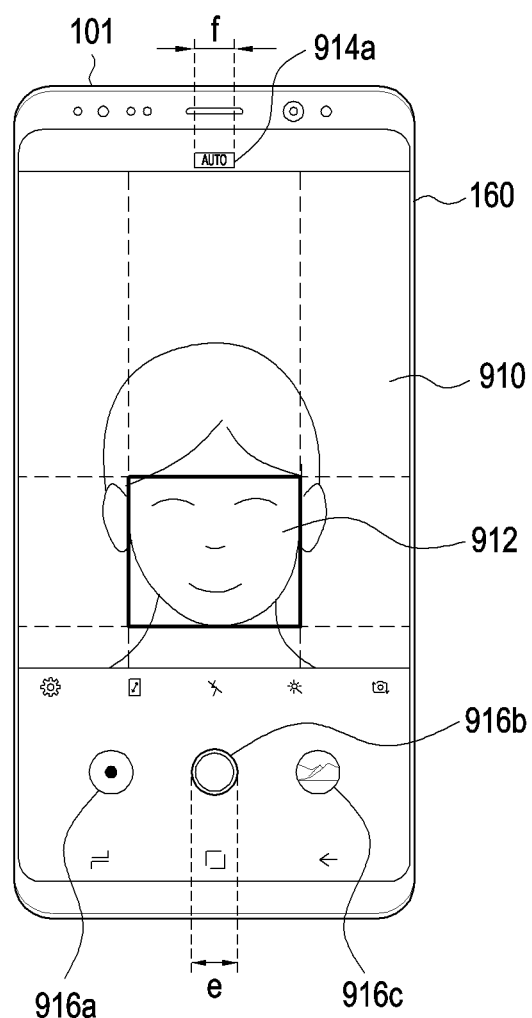

Referring to FIG. 9D, when the target object image 912 is enlarged, the electronic device 101 may shrink the size of the buttons 916a, 916b, and 916c to size e. Size e may be smaller (in diameter) than size a. When the ratio of a portion (e.g., the face) of the target object image 912 to the preview screen 910 is a threshold (e.g., 30% of the entire area of the preview screen 910 or the display device 160) or more, the electronic device 101 may determine that the target object image 912 has been enlarged. The electronic device 101 may shrink and display the capture type 914a currently set into a size smaller than the default size. Size (e.g., horizontal length) f may be smaller than size c or size d.

Figure 9E:
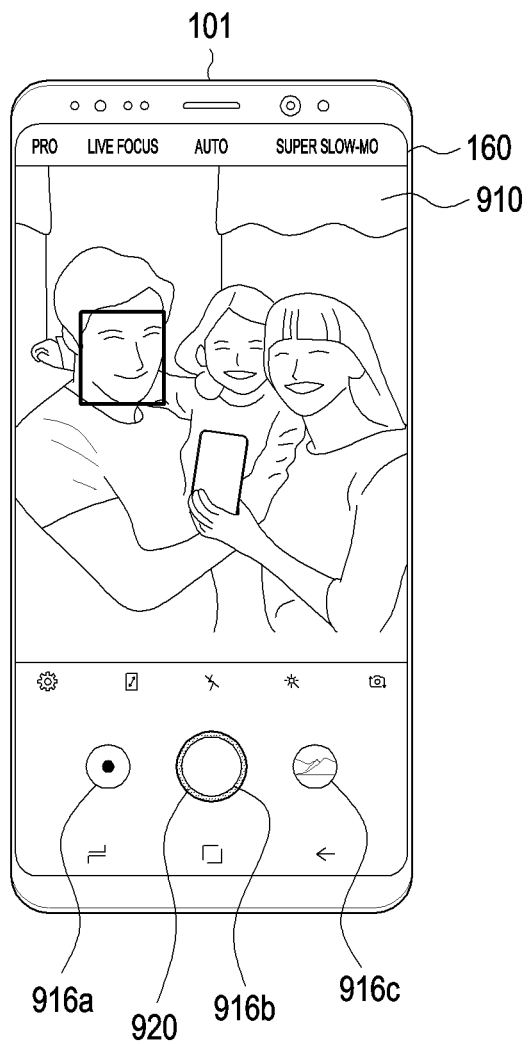
Figure 9F:
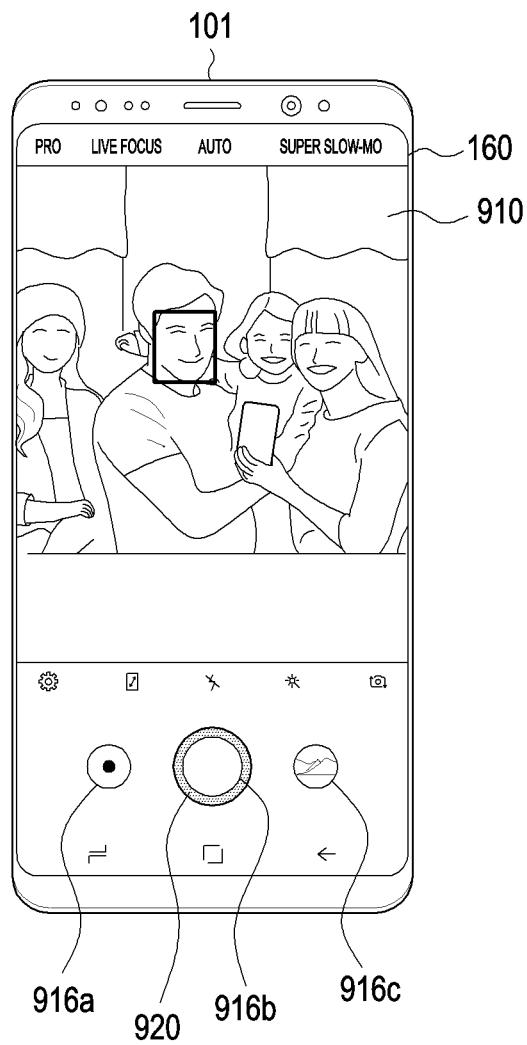
Figure 9G:
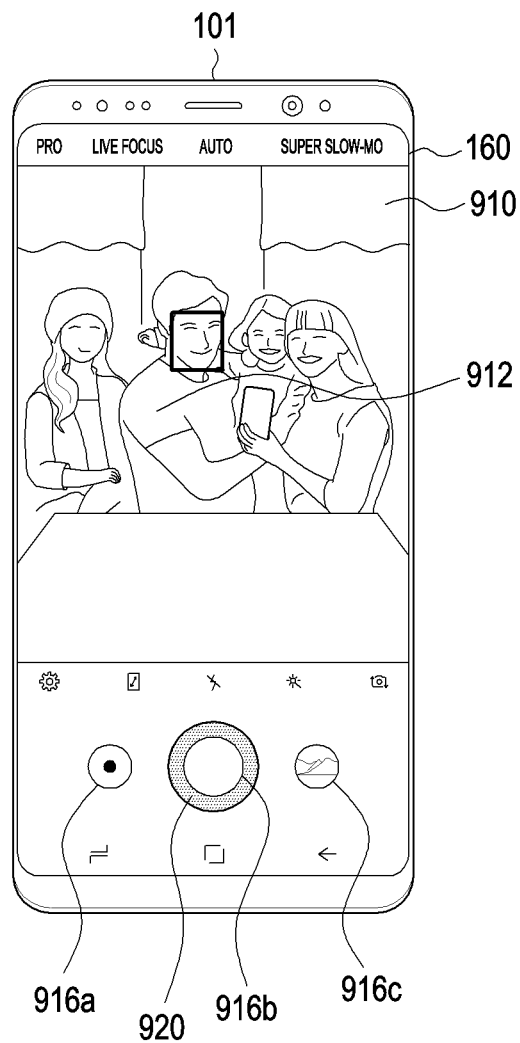

Referring to FIGS. 9E to 9G, the electronic device 101 may perform control to display a visual effect (e.g., bordering 920) around the capture button 916b corresponding to a resizing of at least one target object image 912. FIG. 9E illustrates an example in which a visual effect (e.g., bordering 920) with the default size (or area) is displayed. The default size may include a predesignated size.

As shown in FIG. 9F, when at least one target object image 912 shrinks (e.g., when the ratio of a portion of at least one target object image 912 to the preview screen 910 is a first threshold (e.g., 10%) or less as the electronic device 101 or the object moves), the electronic device 101 may enable the visual effect-displayed area to be larger than the visual effect-displayed area shown in FIG. 9E. As shown in FIG. 9G, when at least one target object image 912 shrinks more than that which is shown in FIG. 9F (e.g., when the ratio of a portion of at least one target object image 912 to the preview screen 910 is a second threshold (e.g., 3.2%) or less as the electronic device 101 or the pen input device 201 moves), the electronic device 101 may perform control to enable the visual effect-displayed area to be larger than the visual effect-displayed area shown in FIG. 9F. The electronic device 101 may continuously or discretely (e.g., stepwise) vary the visual effect-displayed area depending on resizing of the target object image 912 (e.g., changes in distance between the electronic device and the pen input device 201). The distance between the electronic device 101 and the pen input device 201 may be divided into a few ranges, e.g., a first range (e.g., 1.5 m to 2 m), a second range (e.g., 2 m to 2.5 m), and a third range (e.g., greater than 2.5 m). The electronic device 101 may stepwise resize and output various graphical objects or capture notification sound included in the preview screen 910 according to the ranges.

Figure 9H:
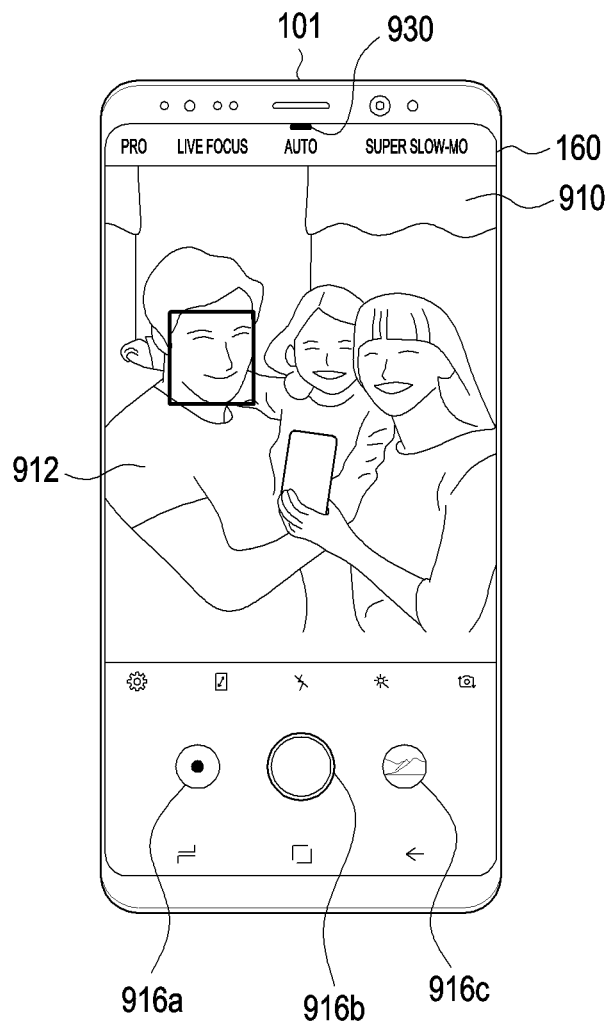
Figure 9I:
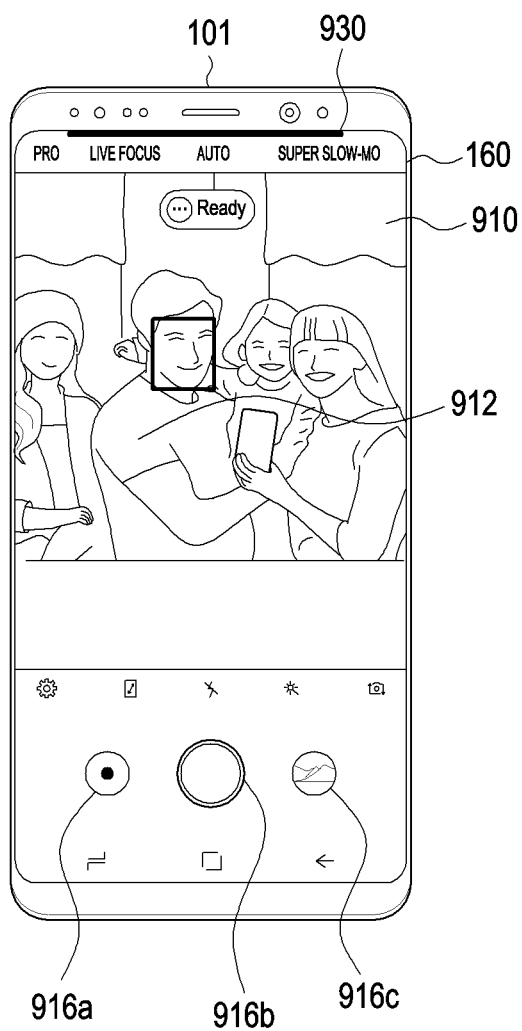
Figure 9J:
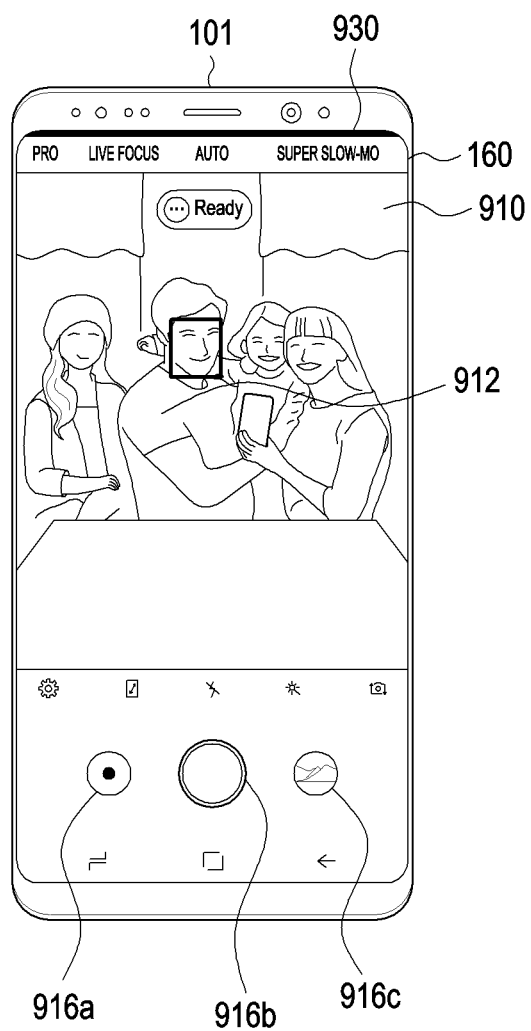

Referring to FIGS. 9H to 9J, the electronic device 101 may perform control to display a visual effect (e.g., a bar 930) at the top of the preview screen 910 corresponding to a resizing of at least one target object image 912. FIG. 9H illustrates an example in which a visual effect (e.g., a bar 930) with the default size (or area) is displayed. As shown in FIG. 9I, when at least one target object image 912 shrinks (e.g., when the ratio of at least one target object image 912 to the preview screen 910 is a first threshold (e.g., 10%) or less as the electronic device 101 or the object moves), the electronic device 101 may enable the visual effect (e.g., the bar 930) to be longer than the visual effect shown in FIG. 9H. As shown in FIG. 9J, when at least one target object image 912 shrinks further than that which is shown in FIG. 9I (e.g., when the ratio of at least one target object image 912 to the preview screen 910 is a second threshold (e.g., 3.2%) or less as the electronic device 101 or the object moves), the electronic device 101 may enable the visual effect (e.g., the bar 930) to be longer than the visual effect (e.g., the bar 930) shown in FIG. 9I. The electronic device 101 may continuously or discretely (e.g., stepwise) vary the length of the visual effect (e.g., the bar 930) depending on at least one resizing of the target object image 912 (e.g., changes in distance between the electronic device 101 and the pen input device 201).

Figure 9K:
Figure 9L:

Referring to FIGS. 9K to 9L, the electronic device 101 may perform control to display a visual effect (e.g., a designated color 940) along the edge of the preview screen 910 corresponding to a resizing of at least one target object image 912. The electronic device 101 may display a notification 950 (e.g., a Bluetooth symbol) indicating the state of being connected with the pen input device via short-range wireless communication inside the capture button 916b. FIG. 9K illustrates an example in which a visual effect (e.g., a designated color 940) is displayed according to a default area. As shown in FIG. 9L, when at least one target object image 912 shrinks as the electronic device 101 or at least one target object image 912 moves, the electronic device 101 may increase the area in which the visual effect (e.g., the designated color 940) is displayed. The designated color 940 may be blue. At least some of the embodiments described above in connection with FIGS. 9A to 9L may be combined together.

Figure 10A:
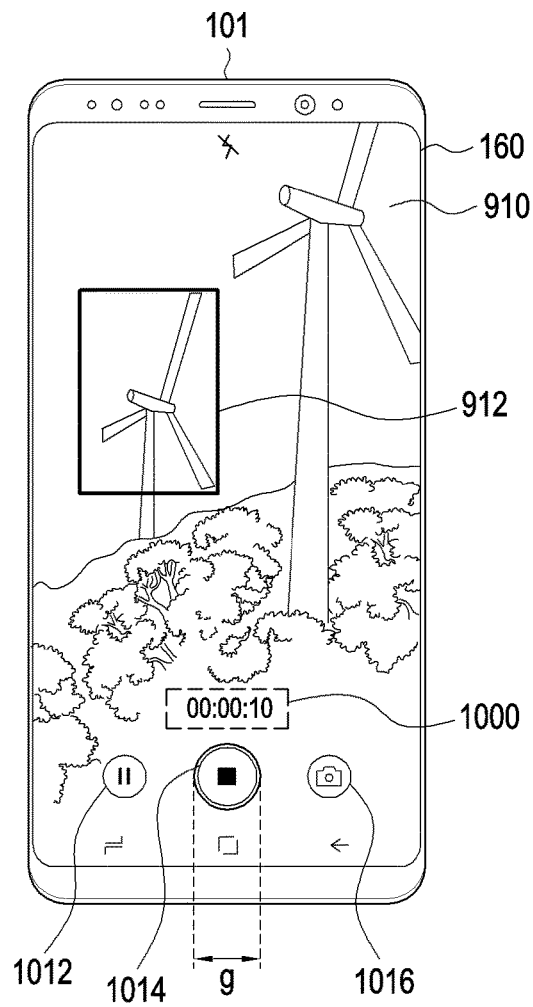
FIGS. 10A and 10B are views illustrating operations of controlling an execution screen (e.g., a preview screen) of a camera application depending on a distance between an electronic device and a user when recording a video, according to various embodiments.
Figure 10B:
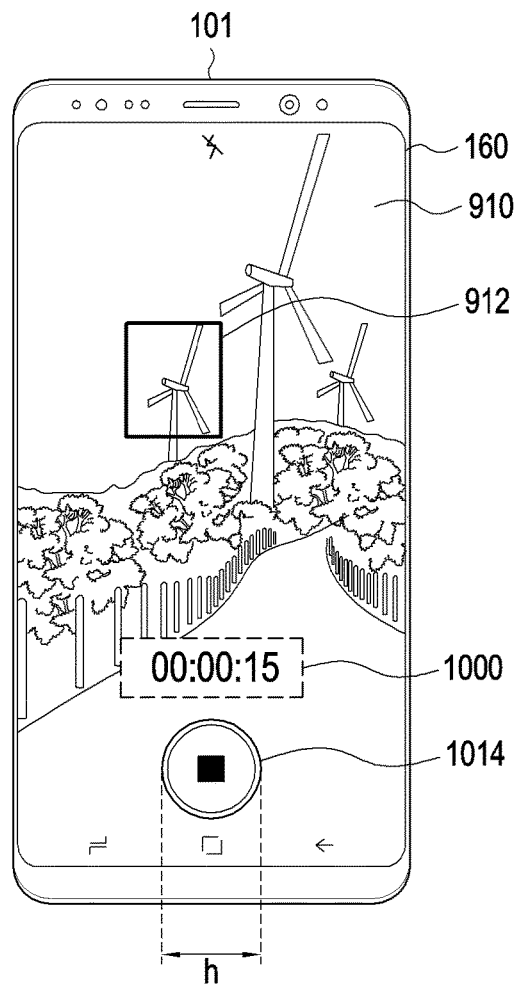

FIGS. 10A and 10B illustrate operations of controlling a preview screen 910 of a camera application depending on the distance between an electronic device 101 and a pen input device 201 upon recording a video.

Referring to FIG. 10A, the electronic device 101 displays a preview screen 910 on the display device 160. The preview screen 910 includes at least one target object image 912, a button 1012 for pausing video recording, a terminate button 1014 for terminating video recording, a mode switch button 1016 for capturing still images, and a time lapse 1000 from the start time of video recording. FIG. 10A illustrates an example in which various objects 1000, 1012, 1014, and 1016 are displayed according to the default settings when a size of a portion (e.g., the user's face) of the target object image 912 is less than a threshold.

Referring to FIG. 10B, upon determining that the ratio of a portion (e.g., the user's face) of the target object image 912 to the preview screen 910 is a threshold or less, the electronic device 101 may enlarge and display at least one of the terminate button 1014 for terminating video recording and the time lapse 1000 from the start time of video recording in a predesignated proportion. For example, size g (e.g., diameter) of the terminate button 1014 may be smaller than size h (e.g., diameter). Upon determining that the ratio of the portion (e.g., the user's face) of the target object image 912 to the preview screen 910 is the predetermined threshold or less, the electronic device 101 may refrain from displaying at least some buttons (e.g., the button 1012 for pausing video recording and the mode switch button 1016 for capturing still images).

Figure 11:
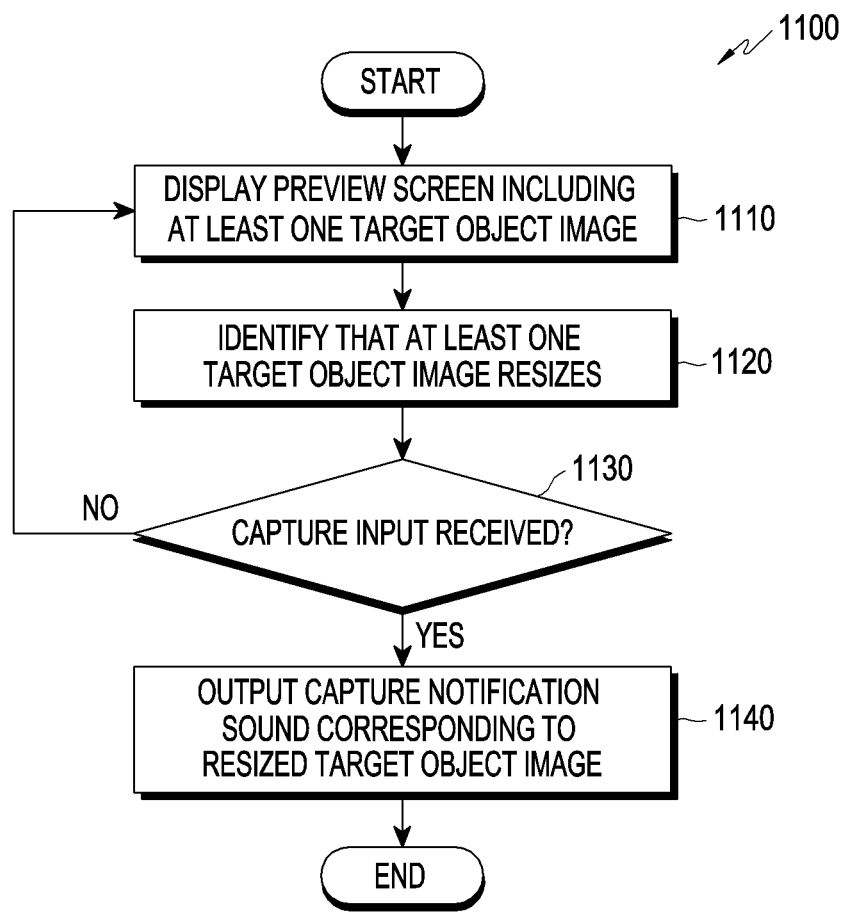
FIG. 11 is a flowchart illustrating a method of operating an electronic device, according to an embodiment.

FIG. 11 is a flowchart illustrating a method 1100 of operating an electronic device 101, according to an embodiment.

Referring to FIG. 11, the electronic device 101 displays a preview screen including at least one target object image in step 1110. The preview screen may include a preview screen for capturing a still image or video.

The electronic device 101 (including the processor 120 of FIG. 1) identifies that at least one target object image has been resized in step 1120. The distance between the electronic device 101 and an object (or a pen input device 201 which the object (i.e., person) holds) based on the degree of resizing of at least one target object image may be determined. The electronic device 101 may determine that the target object image 912 has been resized based on a resizing of a portion (e.g., the user's face) of the target object image.

The electronic device 101 determines whether an input for capturing at least one object is received in step 1130. For example, upon receiving a selection input for the capture button included in the preview screen, the electronic device 101 may determine that the input for capturing at least one target object image has been received. Upon receiving a capture signal (e.g., an input signal on the button part) from the pen input device (e.g., the pen input device 201 of FIG. 2) connected with the electronic device 101 via short-range wireless communication, the electronic device 101 may determine that an input for capturing at least one target object has been received.

The electronic device 101 outputs a capture notification sound corresponding to the changed size of at least one target object image using a sound output device 155 in step 1140. When at least one target object image shrinks, the electronic device 101 may output a capture notification sound in a larger volume than the default notification sound.

Figure 12A:
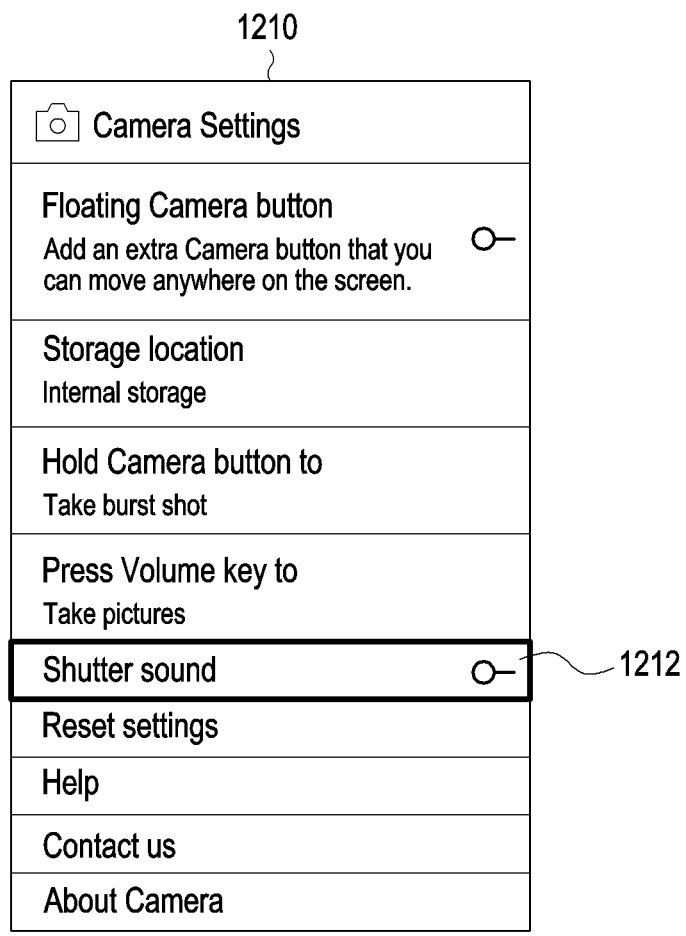
FIGS. 12A, 12B, and 12C are views illustrating operations of outputting a designated magnitude of a capture notification sound depending on a variation in distance between an electronic device and a user (or a pen input device), according to various embodiments.
Figure 12B:
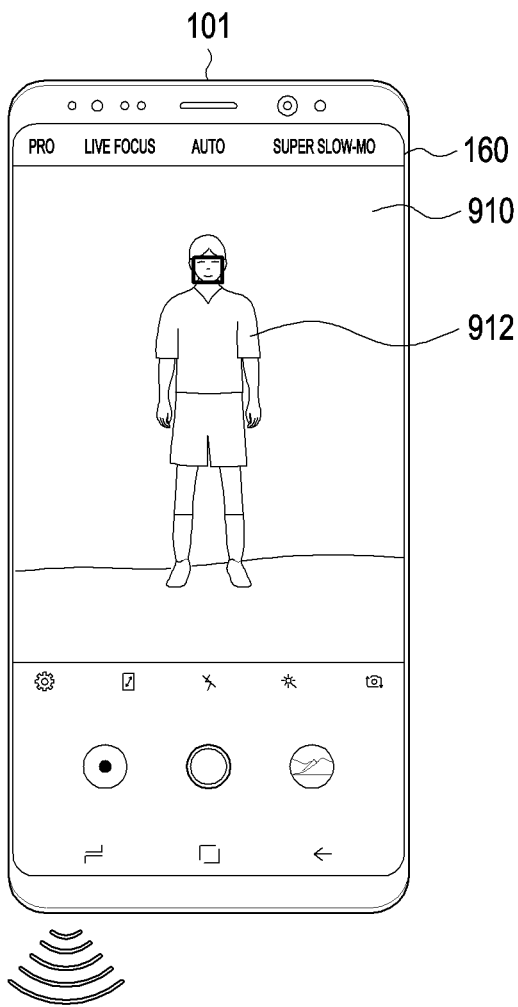
Figure 12C:
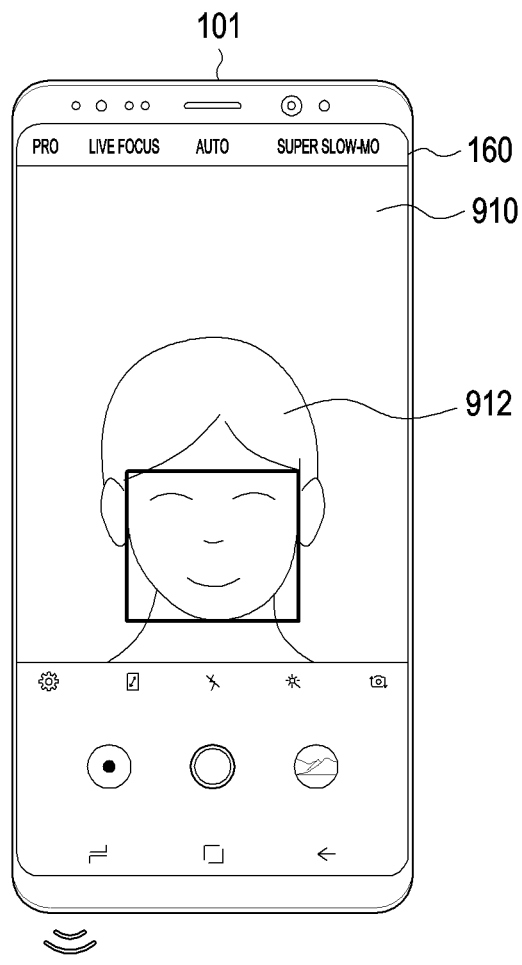

FIGS. 12A to 12C are views illustrating operations of outputting a designated magnitude of capture notification sound depending on a variation in distance between an electronic device and a user (or a pen input device), according to an embodiment.

Referring to FIG. 12A, the electronic device 101 displays a menu 1212 for activating the output of the capture notification sound on the camera settings screen 1210. Upon receiving an activation input (e.g., an input on the button part) from the pen input device 201 connected via short-range wireless communication or the user's touch input on the menu 1212, the electronic device 101 may activate the function of outputting the capture notification sound.

Referring to FIG. 12B, when the ratio of a portion (e.g., the user's face) of the target object image 912 to the preview screen 910 is a threshold (e.g., 3.2%) or less, the electronic device 101 may output a capture notification sound through the sound output device 155 in a larger volume than the default volume. Referring to FIG. 12C, when the ratio of a portion (e.g., the user's face) of the target object image 912 to the preview screen 910 is a threshold (e.g., 30%) or more, the electronic device 101 may output a capture notification sound through the sound output device 155 in a smaller volume than the default volume.

Figure 13:
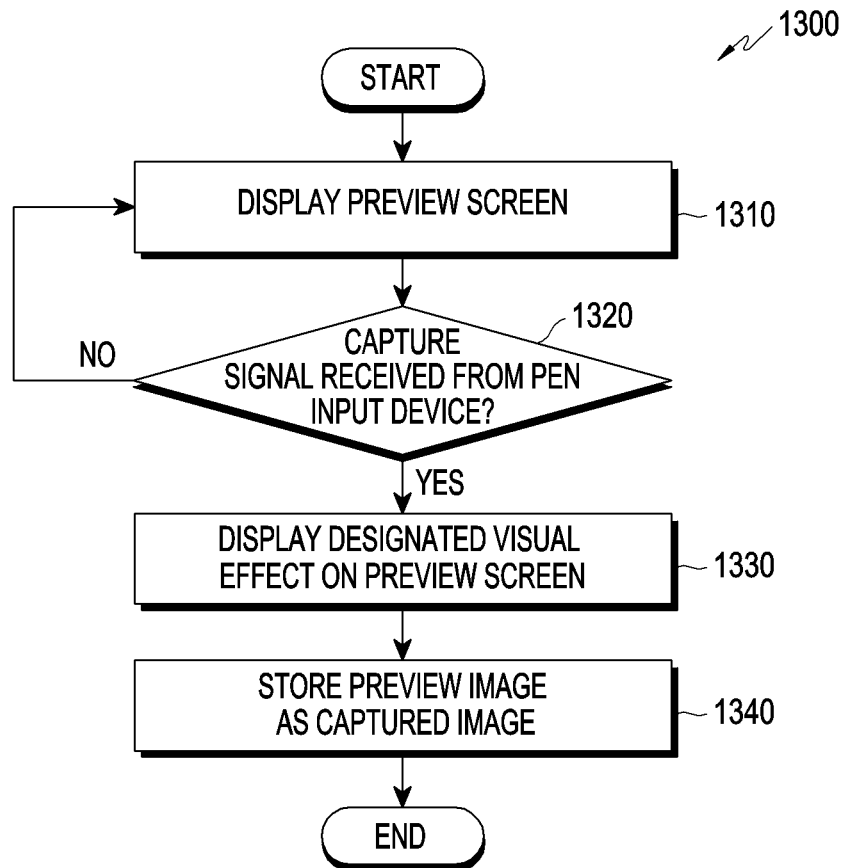
FIG. 13 is a flowchart illustrating a method of operating an electronic device, according to an embodiment.

FIG. 13 is a flowchart illustrating a method of operating an electronic device 101, according to an embodiment.

Referring to FIG. 13, the electronic device 101 displays a preview screen in step 1310.

The electronic device 101 determines whether a capture signal is received from the pen input device in step 1320.

Upon receiving a capture signal from the pen input device (yes in step 1320), the electronic device 101 displays a designated visual effect on the preview screen in step 1330. The designated visual effect may include an effect of emitting surface light in a designated color (e.g., white). Upon receiving no capture signal from the pen input device (no in step 1320), the electronic device 101 continues to display the preview screen.

The electronic device 101 may store the preview screen as a captured image in step 1340.

Figure 14A:
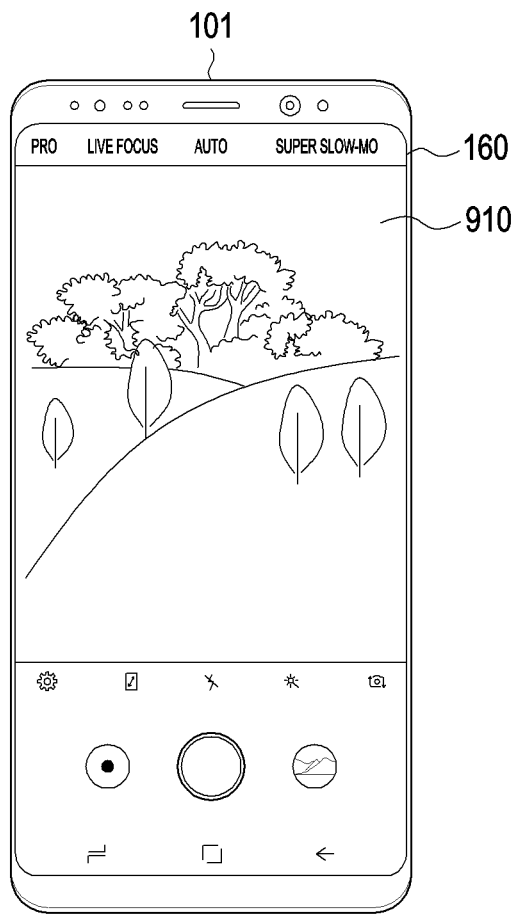
FIGS. 14A and 14B are views illustrating operations of outputting a designated visual effect on an execution screen (e.g., a preview screen) of a camera application when an object (or a target object) is captured through a pen input device, according to various embodiments.
Figure 14B:
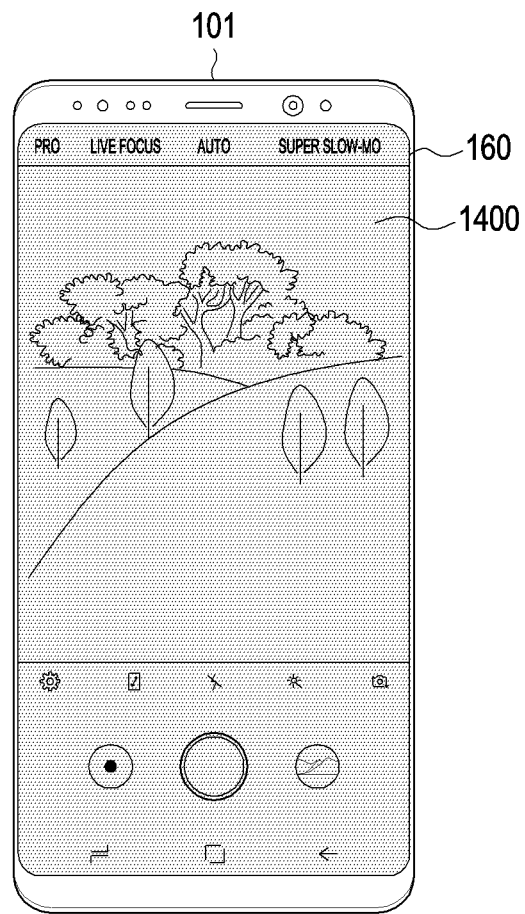

FIGS. 14A and 14B are views illustrating operations of outputting a designated visual effect on a preview screen when an object (i.e., a target object) is captured through a pen input device, according to an embodiment.

Referring to FIGS. 14A and 14B, upon identifying capturing via a pen input device, the electronic device 101 may display a designated visual effect 1400 (e.g., a surface light emission effect) on the preview screen. The surface light emission effect may be displayed in a semitransparent or opaque manner.

Figure 15:
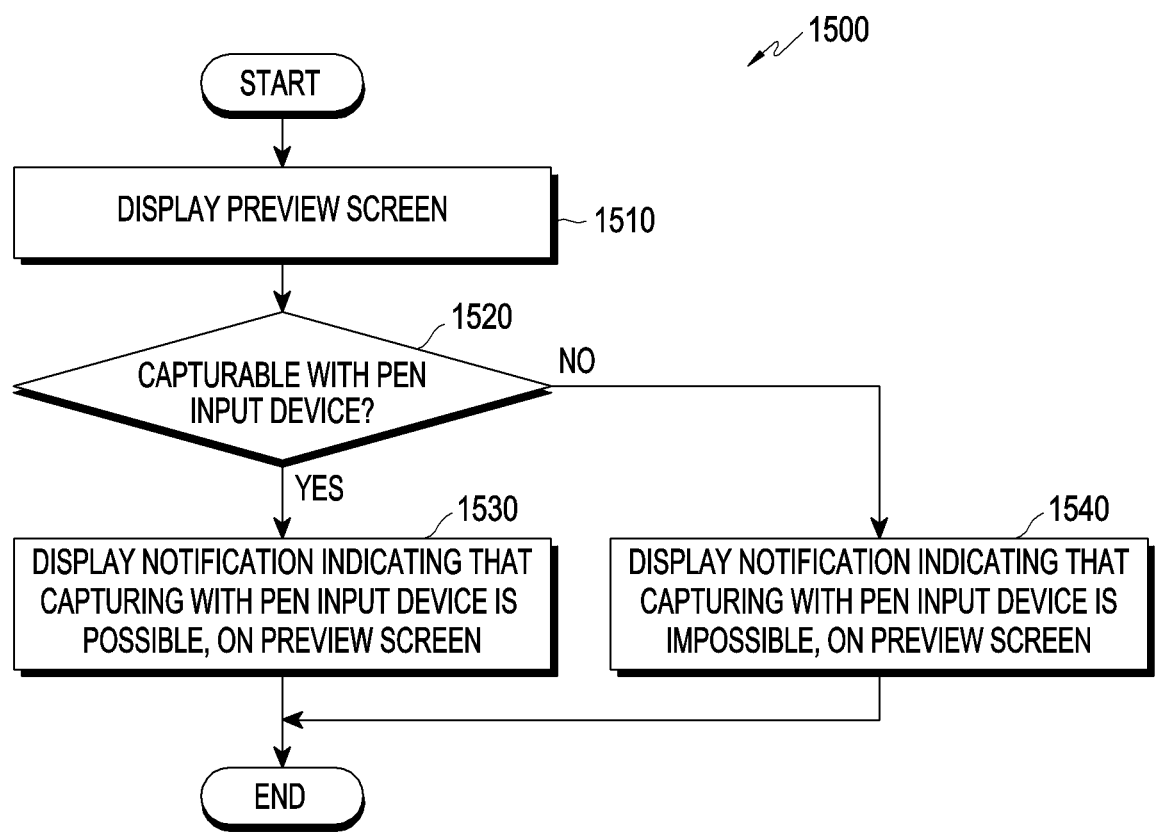
FIG. 15 is a flowchart illustrating a method of operating an electronic device, according to an embodiment.

FIG. 15 is a flowchart illustrating a method of operating an electronic device 101, according to an embodiment.

Referring to FIG. 15, the electronic device 101 (including the processor 120 of FIG. 1) displays a preview screen in step 1510.

The electronic device 101 determines whether capturing with a pen input device is possible in step 1520. The electronic device 101 may determine whether capturing with a pen input device is possible based on whether a wireless signal of a predesignated strength or more is received from the pen input device. For example, when the distance between the electronic device 101 and the pen input device 201 is greater than 10 meters (m), the electronic device 101 may determine that such capturing is impossible. The electronic device (including the memory 130 of FIG. 1) may store information (e.g., a lookup table) indicating the correspondence between the distance from the electronic device 101 and the strength of wireless signal transmitted from the pen. The electronic device 101 may determine the distance between the electronic device and the pen input device using the information indicating the correspondence between the distance from the electronic device 101 and the strength of the wireless signal.

Upon determining that capturing with a pen input device is possible (yes in step 1520), the electronic device 101 displays a notification indicating that capturing with a pen input device is possible on the preview screen in step 1530.

Upon determining that capturing with a pen input device is impossible (no in step 1520), the electronic device 101 displays a notification indicating that capturing with a pen input device is impossible on the preview screen in step 1540.

FIGS. 16A to 16G illustrate operations of the electronic device 101 to control the preview screen, depending on the distance between the electronic device 101 and the pen input device 201, according to various embodiments.

Figure 16A:
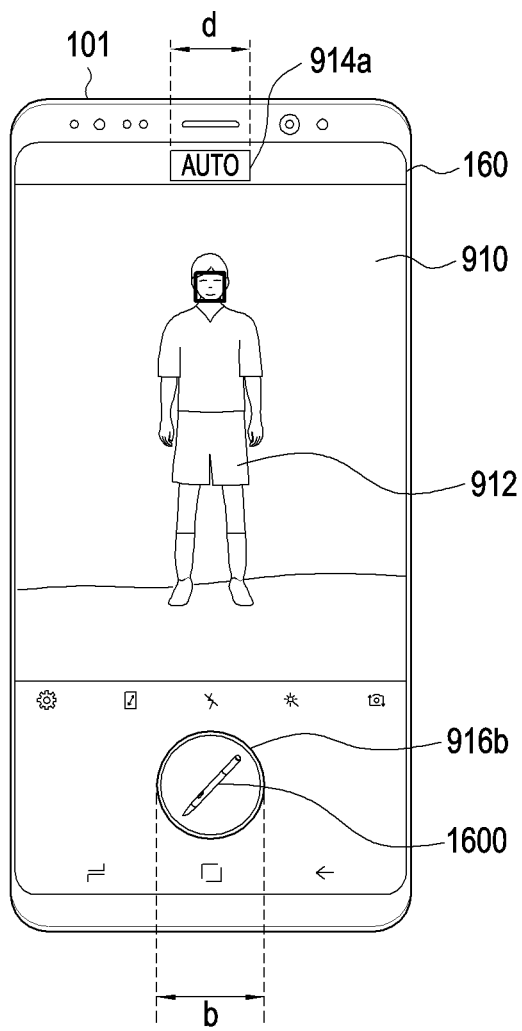
FIGS. 16A, 16B, 16C, 16D, 16E, 16F, and 16G are views illustrating operations of an electronic device to control an execution screen (e.g., a preview screen) of a camera application depending on a distance between the electronic device and a pen input device, according to various embodiments.
Figure 16B:
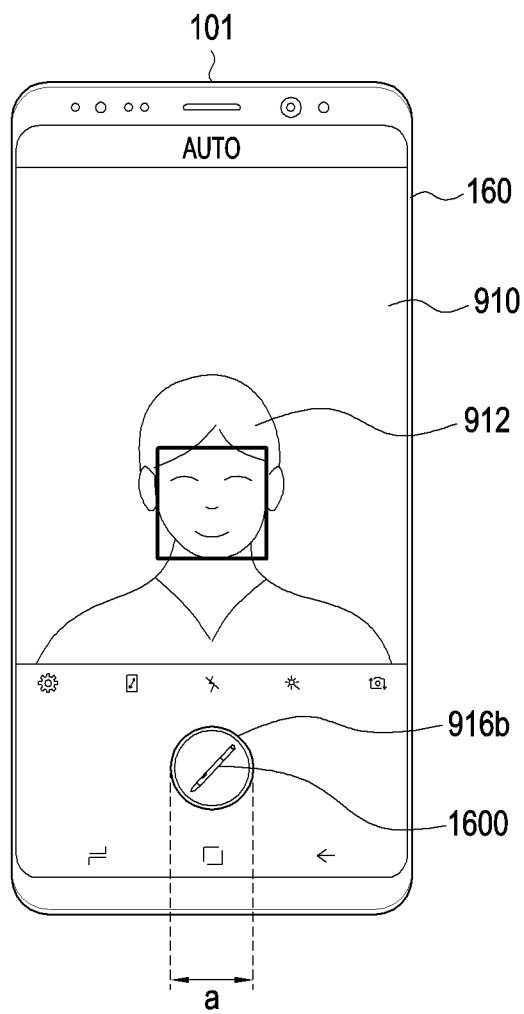

Referring to FIGS. 16A and 16B, the electronic device 101 displays a preview screen 910 including a target object image 912 and a capture button 916*b* on the display device 160. FIG. 16A illustrates displaying a capture button 916*b* with an increased size b on the preview screen 910. The electronic device 101 may display a first notification 1600 indicating that photo taking with the pen input device 201 is possible inside the capture button 916*b*.

Referring to FIG. 16B, the electronic device 101 displays the first notification 1600 indicating that it is possible to capture a still image or video with the pen input device 201 inside the capture button 916*b* with the default size a. When the pen input device 201 is removed from the electronic device 101, the electronic device 101 may perform control to only display at least one type of the capture types and the still image capture button 916*b* on the preview screen 910.

Figure 16C:
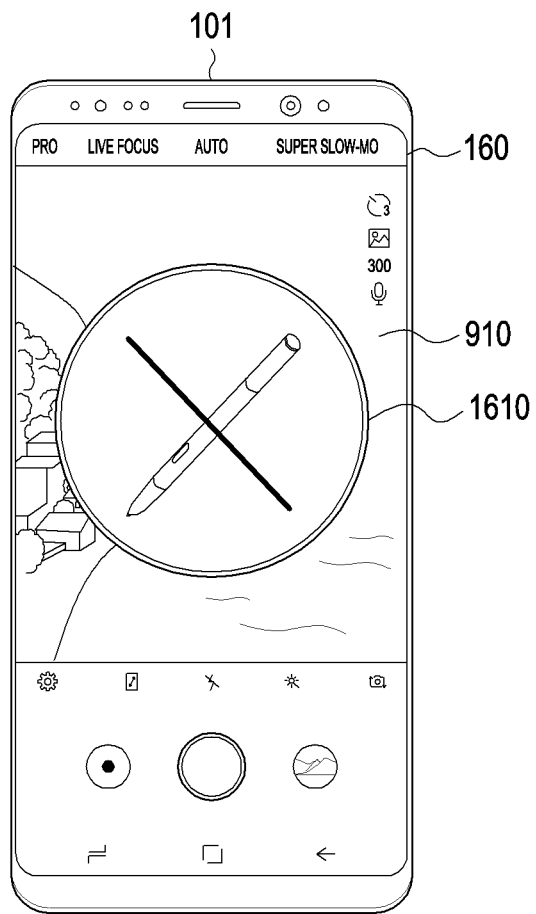

Referring to FIG. 16C, the electronic device 101 displays a second notification 1610 indicating that it is impossible to capture a still image or video with the pen input device 201 on the preview screen 910. Accordingly, the user of the electronic device 101 may easily identify that capturing with the pen input device 201 is impossible even in a remote site (e.g., 10 m or more away from the electronic device 101).

Figure 16D:
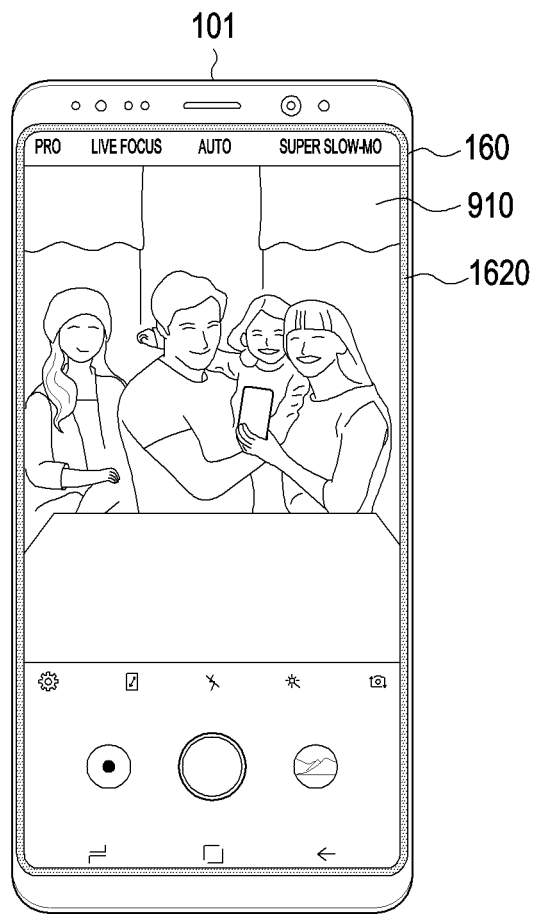

Referring to FIG. 16D, the electronic device 101 displays a third notification 1620 indicating that it is impossible to capture a still image or video with the pen input device 201 on the preview screen 910. The third notification 1620 may include a notification displayed to have a designated color (e.g., red) along the edge of the preview screen 910.

Figure 16E:
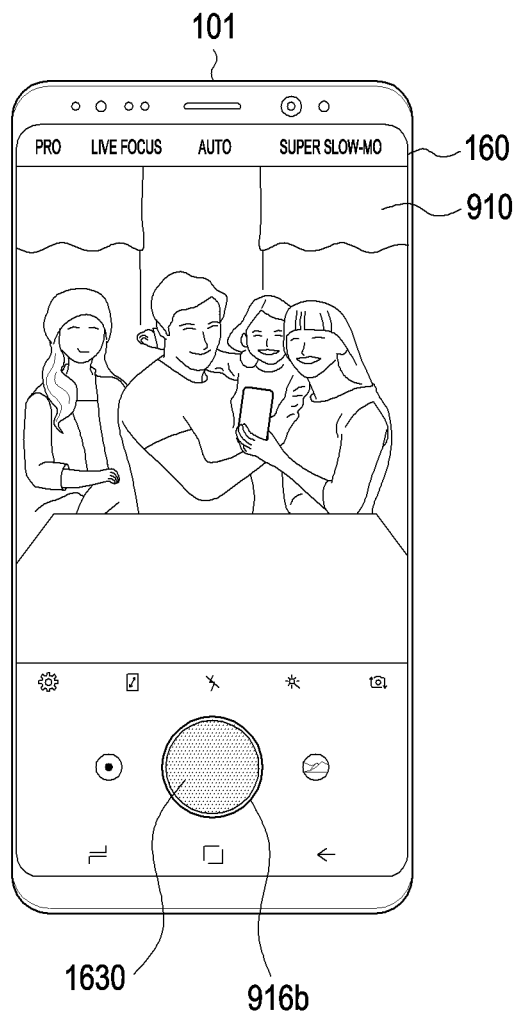

Referring to FIG. 16E, the electronic device 101 displays a fourth notification 1630 indicating that it is impossible to capture a still image or video with the pen input device 201 on the preview screen 910. The fourth notification 1630 may include a notification displayed to have a designated color (e.g., red) in the inside of the capture button 916*b*.

As illustrated in FIG. 16E, when the distance between the pen input device 201 (or the user holding the pen input device) and the electronic device 101 is identified by the electronic device 101 to be a designated distance (e.g., 10 m) or more, the capture button 916*b* may be enlarged and other buttons (e.g., 916*a* and 916*c*) may decrease to a size smaller than the default size.

Figure 16F:
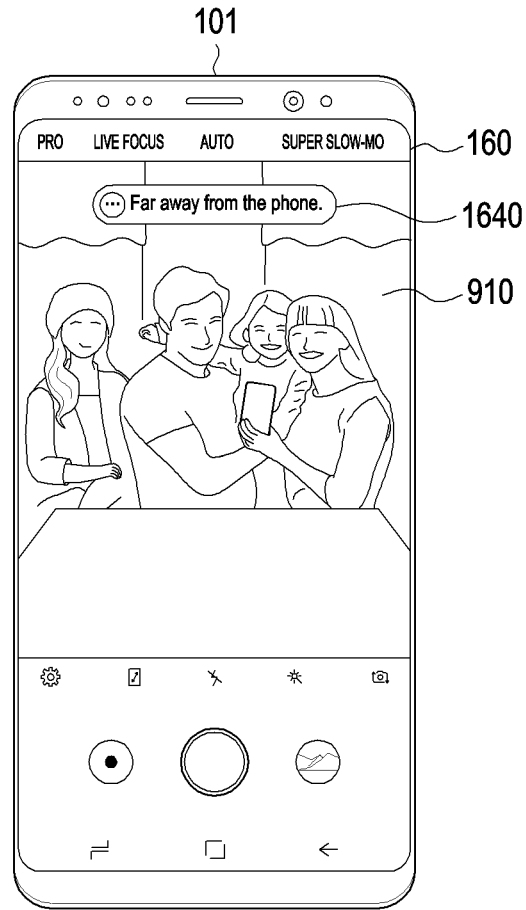

Referring to FIG. 16F, the electronic device 101 displays a fifth notification 1640 indicating that it is impossible to capture a still image or video with the pen input device 201 on the preview screen 910. The fifth notification 1640 may include a notification message indicating that the distance between the pen input device 201 and the electronic device 101 is a designated distance or more.

Figure 16G:
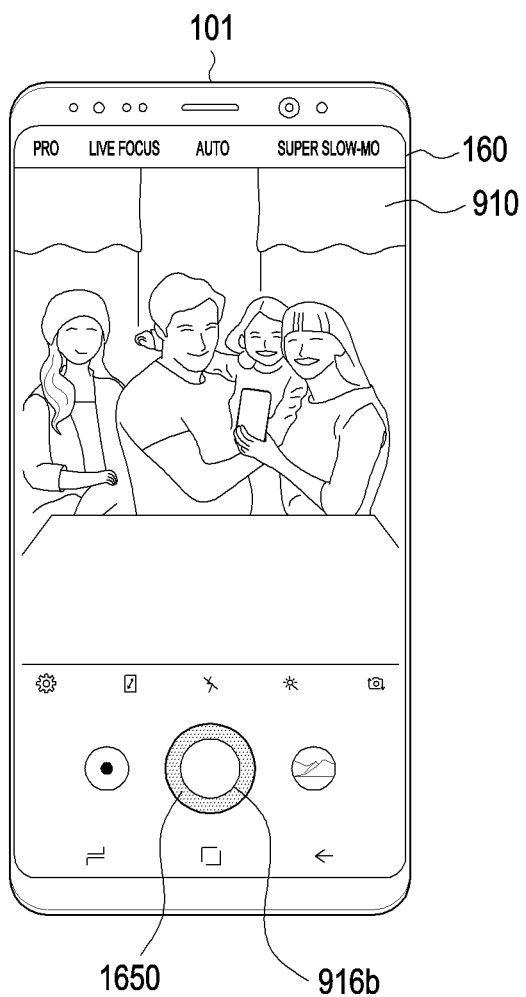

Referring to FIG. 16G, the electronic device 101 displays a sixth notification 1650 indicating that it is impossible to capture a still image or video with the pen input device 201 on the preview screen 910. The sixth notification 1650 may include a notification displayed to have a designated color (e.g., red) in the border of the capture button 916*b*.

The electronic device 101 may determine the distance between the electronic device 101 and the pen input device 201 based on the strength of a wireless signal transmitted from the pen input device 201. The electronic device 101 may perform various operations or functions based on the distance between the electronic device 101 and the pen input device 201 determined based on the strength of the wireless signal. At least some of the embodiments described above in connection with FIGS. 16A to 16G may be combined together.

Figure 17:
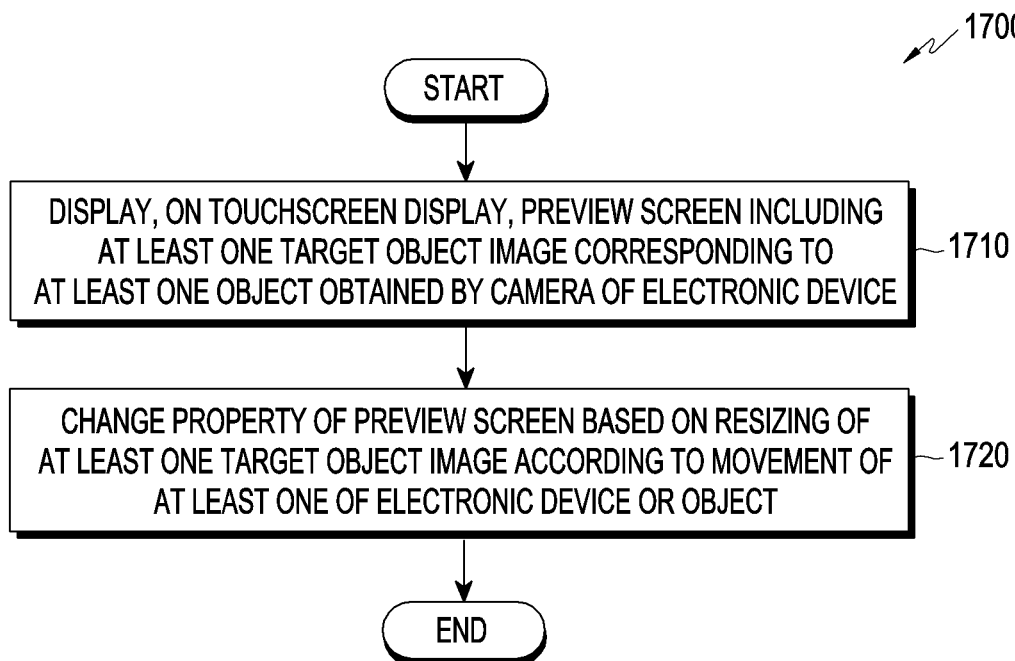
FIGS. 17 and 18 are flowcharts illustrating methods of operating an electronic device, according to various embodiments.
Figure 18:
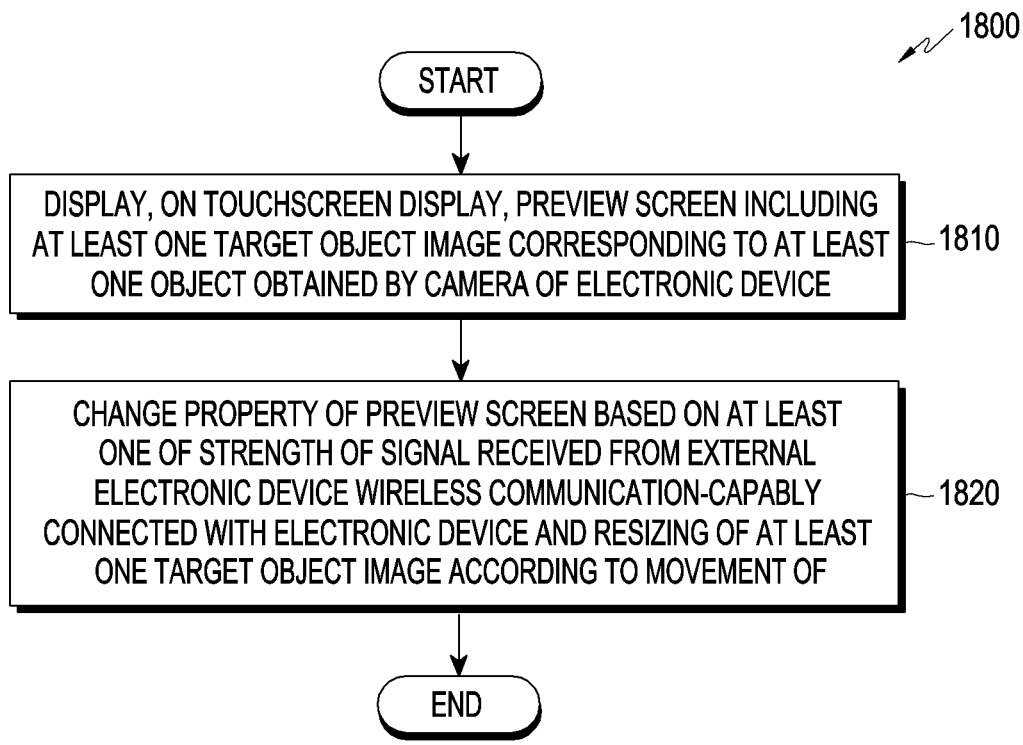

FIGS. 17 and 18 are flowcharts illustrating methods 1700 and 1800 of operating an electronic device 101, according to an embodiment.

Referring to FIG. 17, the electronic device 101 displays, on the touchscreen display (e.g., the display device 160 of FIG. 1), a screen (e.g., the preview screen 910 of FIG. 9) including at least one target object image corresponding to at least one object obtained by the camera of the electronic device in step 1710.

In step 1720, the electronic device 101 changes the properties of the screen based on a resizing of at least one target object image according to a movement of at least one of the object and the electronic device 101.

Referring to FIG. 18, the electronic device 101 displays, on the touchscreen display (e.g., the display device 160 of FIG. 1), a screen including at least one target object image corresponding to at least one object obtained by the camera of the electronic device in step 1810.

In step 1820, the electronic device 101 changes the properties of the screen (e.g., the preview screen 910 of FIG. 9) based on at least one of the strength of a signal received from an external electronic device (e.g., the pen input device 201 of FIG. 2) wirelessly connected with the electronic device 101 and resizes at least one target object image according to a movement of at least one of the electronic device 101 and the object.

According to an embodiment, an electronic device comprises a camera, a touchscreen display, and a processor configured to display, on the touchscreen display, a screen including at least one target object image corresponding to at least one object obtained by the camera, and change a property of the screen based on a resizing of the at least one target object image according to a movement of at least one of the electronic device or the object.

The screen may further include a plurality of graphical objects related to capturing the at least one object.

The processor may further be configured to, upon identifying that the at least one target object image shrinks to a size smaller than a predesignated threshold size, enlarge at least one of the plurality of graphical objects to change the property of the screen.

The processor may further be configured to change the property of the screen by refraining from displaying graphical objects other than the at least one graphical object among the plurality of graphical objects.

The processor may further be configured to, upon identifying that the at least one target object image shrinks to a size smaller than the predesignated threshold size, output, via the electronic device, a predesignated sound corresponding to each degree of shrinkage.

The electronic device may further comprise a communication circuit configured to establish short-range wireless communication with an external electronic device. The processor may be configured to store the screen as a captured image in the electronic device according to a capture signal received from the external electronic device connected with the electronic device via the short-range wireless communication.

The external electronic device may detachably be connected with the electronic device. The processor may be configured to, upon detecting disconnection of the external electronic device from the electronic device, display a notification indicating disconnection of the external electronic device on the screen through at least one of the plurality of graphical objects to thereby change the screen property.

The processor may be configured to display, on the screen, a notification indicating that communication with the external electronic device is impossible upon identifying that the at least one target object shrinks to a size smaller than a predesignated threshold size with the external electronic device disconnected from the electronic device.

The notification may be displayed along the edge of the touchscreen display.

According to an embodiment, a method for controlling an electronic device comprises displaying, on a touchscreen display of the electronic device, a screen including at least one target object image corresponding to at least one object obtained by a camera of the electronic device, and changing a property of the screen based on a resizing of the at least one target object image according to a movement of at least one of the electronic device or the object.

According to an embodiment, an electronic device comprises a camera, a touchscreen display, and a processor configured to display, on the touchscreen display, a screen including at least one target object image corresponding to at least one object obtained by the camera, and change a property of the screen based on at least one of a strength of a signal received from an external electronic device wirelessly and detachably connected with the electronic device or based on a resizing of the at least one target object image according to a movement of at least one of the electronic device or the object.

The wireless communication may be at least partially based on BLE.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if ah element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

As is apparent from the foregoing description, according to various embodiments of the disclosure, the screen properties (e.g., the size of graphical objects) of an application (e.g., a camera application) may be controlled based on the distance between the electronic device and the pen input device (or the user holding the pen input device), thus providing the user with visual convenience.

The effects set forth herein are not limited thereto, and it is apparent to one of ordinary skill in the art that various effects may be disclosed herein.

While the disclosure has been shown and described with reference to certain exemplary embodiments thereof, it will be understood by those skilled in the art that various changes in form and details may be made therein without departing from the spirit and scope of the disclosure as defined by the appended claims and their equivalents.

What is claimed is:

1. An electronic device, comprising:
    a camera;
    a touchscreen display; and
    a processor configured to:
        display, on the touchscreen display, a screen including at least one target object image corresponding to at least one subject obtained by the camera and at least one graphical object configured to capture the at least one subject in response to receiving an input,
        identify that the at least one target object image is resized according to a movement of at least one of the electronic device or the at least one subject, and
        in response to identifying the resizing of the at least on target object image, change a property of the screen by resizing the at least one graphical object.

2. The electronic device of claim 1, wherein the screen further includes a plurality of graphical objects related to capturing the at least one subject.

3. The electronic device of claim 2, wherein the processor is further configured to, upon identifying that the at least one target object image shrinks in a predesignated threshold proportion or more, enlarge the at least one graphical object to change the property of the screen.

4. The electronic device of claim 2, wherein the processor is further configured to change the property of the screen by refraining from displaying graphical objects other than the at least one graphical object among the plurality of graphical objects.

5. The electronic device of claim 2, further comprising a communication circuit configured to establish short-range wireless communication with an external electronic device, wherein the processor is configured to store the screen as a captured image in the electronic device according to a capture signal received from the external electronic device connected with the electronic device via the short-range wireless communication.

6. The electronic device of claim 5, wherein the external electronic device is detachably connected with the electronic device, and
    wherein the processor is further configured to, upon detecting disconnection of the external electronic device from the electronic device, change the property of the screen by displaying a notification indicating the disconnection of the external electronic device on the screen.

7. The electronic device of claim 6, wherein the processor is further configured to, upon determining that a distance between the external electronic device and the electronic device exceeds a predesignated distance, display a notification indicating that communication with the external electronic device is impossible on the screen when the external electronic device is disconnected from the electronic device.

8. The electronic device of claim 7, wherein the notification is displayed along an edge of the touchscreen display according to a predesignated area.

9. A method for controlling an electronic device, the method comprising:
    displaying, on a touchscreen display of the electronic device, a screen including at least one target object image corresponding to at least one subject obtained by a camera of the electronic device and at least one graphical object configured to capture the at least one subject in response to receiving an input;
    identifying that the at least one target object image is resized according to a movement of at least one of the electronic device or the at least one subject; and
    in response to identifying the resizing of the at least one target object image, changing a property of the screen by resizing that at least one graphical object.

10. The method of claim 9, wherein the screen further includes a plurality of graphical objects related to capturing the at least one subject.

11. The method of claim 10, wherein changing the property of the screen includes, upon identifying that the at least one target object image shrinks in a predesignated threshold proportion or more, enlarging the at least one graphical object.

12. The method of claim 10, wherein changing the property of the screen includes refraining from displaying graphical objects other than the at least one graphical object among the plurality of graphical objects.

13. The method of claim 10, further comprising storing the screen as a captured image in the electronic device according to a capture signal received from an external electronic device connected with the electronic device via short-range wireless communication.

14. The method of claim 13, wherein the external electronic device is detachably connected with the electronic device, and
wherein changing the property of the screen includes, upon detecting disconnection of the external electronic device from the electronic device, displaying a notification indicating the disconnection of the external electronic device on the screen.

15. The method of claim 14, further comprising, when a distance between the external electronic device and the electronic device exceeds a predesignated distance, displaying a notification indicating that communication with the external electronic device is impossible on the screen when the external electronic device is disconnected from the electronic device.

16. The method of claim 15, wherein the notification is displayed along an edge of the touchscreen display according to a predesignated area.

17. An electronic device, comprising:
a camera;
a touchscreen display; and
a processor configured to:
display, on the touchscreen display, a screen including at least one target object image corresponding to at least one subject obtained by the camera and at least one graphical object configured to capture the at least one subject in response to receiving an input,
identify a change of a strength of a signal from a wireless external electronic device connected with the electronic device while the screen is displayed on the touchscreen display, and
in response to identifying the change of the strength of the signal from the wireless external electronic device connected with the electronic device, change a property of the screen by resizing the at least one graphical object.

18. The electronic device of claim 17, wherein the wireless communication is at least partially based on Bluetooth low energy (BLE).

\* \* \* \* \*